(12) United States Patent
Kimishima

(10) Patent No.: US 10,976,162 B2
(45) Date of Patent: Apr. 13, 2021

(54) INFORMATION PROCESSING APPARATUS, INFORMATION PROCESSING METHOD FOR ACQUIRING PRECISE POSITION IN AUTONOMOUS NAVIGATION SYSTEM

(75) Inventor: Masato Kimishima, Tokyo (JP)

(73) Assignee: Sony Corporation, Tokyo (JP)

( * ) Notice: Subject to any disclaimer, the term of this patent is extended or adjusted under 35 U.S.C. 154(b) by 1218 days.

(21) Appl. No.: 14/237,423

(22) PCT Filed: Jun. 25, 2012

(86) PCT No.: PCT/JP2012/066141
§ 371 (c)(1),
(2), (4) Date: Feb. 6, 2014

(87) PCT Pub. No.: WO2013/031355
PCT Pub. Date: Mar. 7, 2013

(65) Prior Publication Data
US 2014/0180626 A1 Jun. 26, 2014

(30) Foreign Application Priority Data

Aug. 30, 2011 (JP) .............................. JP2011-186709

(51) Int. Cl.
*G01C 21/00* (2006.01)
*G01C 22/00* (2006.01)
(Continued)

(52) U.S. Cl.
CPC ........... *G01C 21/005* (2013.01); *G01C 21/10* (2013.01); *G01C 22/006* (2013.01);
(Continued)

(58) Field of Classification Search
CPC ...... G01C 21/00; G01C 21/26; G01C 21/367; G01C 21/165; G01C 22/00; G01C 21/16;
(Continued)

(56) References Cited

U.S. PATENT DOCUMENTS

| 6,122,960 A * | 9/2000 | Hutchings | A63B 24/00 |
| | | | 73/493 |
| 8,224,351 B1 * | 7/2012 | Sushkov | G01S 5/02 |
| | | | 455/456.1 |

(Continued)

FOREIGN PATENT DOCUMENTS

| JP | 07-333000 A | 12/1995 |
| JP | 09-152355 A | 6/1997 |

(Continued)

OTHER PUBLICATIONS

Ming Fatt Yuen, Thesis Dilution of Precision (DOP) Calculation for Mission Planning Purposes, section 4', Dilution of precision' pp. 8-11 (Year: 2009).*

(Continued)

*Primary Examiner* — Regis J Betsch
*Assistant Examiner* — Kaleria Knox
(74) *Attorney, Agent, or Firm* — Chip Law Group

(57) ABSTRACT

There is provided an information processing apparatus including an absolute position acquiring section that acquires an absolute position of a user, an acquiring section that acquires a first value indicating a walking tempo of the user who is walking, a calculation section that calculates a second value indicating a step or a traveling speed of the user by using, as a trigger, movement of a predetermined distance based on the absolute position, and a learning section that learns a correspondence between the first value and the second value by using the second value calculated.

7 Claims, 32 Drawing Sheets

(51) Int. Cl.
*G01S 19/49* (2010.01)
*G01S 5/02* (2010.01)
*G01C 21/10* (2006.01)
*G08G 1/005* (2006.01)
*G01C 21/20* (2006.01)

(52) U.S. Cl.
CPC ............ *G01S 5/0263* (2013.01); *G01S 19/49* (2013.01); *G01C 21/20* (2013.01); *G08G 1/005* (2013.01)

(58) Field of Classification Search
CPC ........ G01S 19/32; G01S 19/42; G01S 5/0036; G01S 13/723; G01S 5/02; A63B 24/00; G06Q 50/22; G09B 9/05; G08G 1/0112
USPC .......................................................... 702/142
See application file for complete search history.

(56) References Cited

U.S. PATENT DOCUMENTS

| | | | |
|---|---|---|---|
| 2007/0005306 A1* | 1/2007 | Foessel | G01S 13/723 702/189 |
| 2009/0096671 A1* | 4/2009 | Mizuochi | G01S 19/32 342/357.23 |
| 2009/0140887 A1* | 6/2009 | Breed | G08G 1/0112 340/990 |
| 2010/0026566 A1* | 2/2010 | Ueda | G01S 19/42 342/357.36 |
| 2010/0209892 A1* | 8/2010 | Lin | G09B 9/05 434/71 |
| 2010/0250115 A1* | 9/2010 | Ohata | G01C 21/367 701/533 |
| 2011/0106487 A1* | 5/2011 | Kourogi | G01C 21/26 702/142 |
| 2011/0141909 A1* | 6/2011 | Hibara | G01S 5/0036 370/241 |
| 2012/0062414 A1* | 3/2012 | Sambongi | G01C 21/165 342/357.25 |
| 2012/0123735 A1 | 5/2012 | Kimishima | |
| 2012/0173270 A1* | 7/2012 | Omidi | G06Q 50/22 705/2 |
| 2012/0176270 A1* | 7/2012 | Shin | G01S 19/40 342/357.28 |
| 2013/0018581 A1* | 1/2013 | Sidhu | G01C 21/16 701/469 |

FOREIGN PATENT DOCUMENTS

| | | | | |
|---|---|---|---|---|
| JP | 10-293038 A | | 11/1998 | |
| JP | 2001-272247 A | | 10/2001 | |
| JP | 2001181147 | * | 10/2001 | ............ G01C 22/00 |
| JP | 2004-085511 A | | 3/2004 | |
| JP | 2004-118410 A | | 4/2004 | |
| JP | 2004-163168 A | | 6/2004 | |
| JP | 2004-340689 A | | 12/2004 | |
| JP | 2009-064136 A | | 3/2009 | |
| JP | 2010-085285 | * | 4/2010 | ............ G01C 22/00 |
| JP | 2010-085285 A | | 4/2010 | |

OTHER PUBLICATIONS

Seon-Woo Lee "Recognition of Walking Behaviors for Pedestrian Navigation" (Year: 2001).*
Joel McNamara "GPS for Dummies" (Year: 2004).*
U.S. Appl. No. 13/290,419, filed Nov. 7, 2011, 2012-0123735, Kimishima.
U.S. Appl. No. 14/239,716, filed Feb. 19, 2014, Kimishima.

* cited by examiner

INFORMATION PROCESSING APPARATUS, INFORMATION PROCESSING METHOD FOR ACQUIRING PRECISE POSITION IN AUTONOMOUS NAVIGATION SYSTEM

TECHNICAL FIELD

The present disclosure relates to an information processing apparatus, an information processing method, a program, and a recording medium.

BACKGROUND ART

In recent years, systems using position information are widely used. Methods of acquiring position information include autonomous navigation. The autonomous navigation is mainly used when absolute positioning such as GPS (Global Positioning System) positioning cannot be used. The autonomous navigation is a method of obtaining the current position information by calculating a relative position from the last positioning point by the absolute positioning using the traveling speed and the direction of movement.

As a method of obtaining the speed by the autonomous navigation when moving on foot, a method of using a pedometer can be mentioned. In this case, the speed can be obtained by using Math (1) shown below.

$$v = k \times f \qquad \text{Math (1)}$$

v is the traveling speed, k is the step of the user, and f is the walking tempo (number of steps per unit time). The walking tempo f used here is calculated by dividing the value of the number of steps acquired by, for example, a pedometer using an acceleration sensor by the time. The step k is different from user to user and is learned in advance.

As the simplest method of learning the step k, the method of dividing the moving distance obtained by GPS positioning by the number of steps while walking can be cited. If the value of the average step is uniformly used, an error increases in circumstances in which the user moves in various steps.

Patent Literature 1 discloses the method of calculating the step by performing GPS positioning at fixed intervals and dividing the moving distance in the meantime by the number of steps. At this point, a correspondence table associating the calculated average step and the average walking tempo in the meantime is created. Using the correspondence table, the step in accordance with the walking tempo obtained from the pedometer can be used to calculate the speed.

CITATION LIST

Patent Literature

Patent Literature 1: JP 2010-85285A

SUMMARY OF INVENTION

Technical Problem

A measurement error of the moving distance relatively increases with a decreasing moving distance. In the method of calculating the step using the moving distance at fixed intervals, however, the user may not move a sufficient distance to allow enough positioning precision during the fixed time. Thus, an error of the step increases if the moving distance in the fixed time is short. Thus, further improvement of precision of a correspondence table used for autonomous navigation during walking has been demanded.

Solution to Problem

According to an embodiment of the present disclosure, there is provided an information processing apparatus including an absolute position acquiring section that acquires an absolute position of a user, an acquiring section that acquires a first value indicating a walking tempo of the user who is walking, a calculation section that calculates a second value indicating a step or a traveling speed of the user by using, as a trigger, movement of a predetermined distance based on the absolute position, and a learning section that learns a correspondence between the first value and the second value by using the second value calculated.

According to the configuration, a step and a traveling speed are calculated by using a moving distance as a trigger. When a traveling time is used as the trigger, the moving distance in an interval may be short because a time period in which a user is paused is long in the interval, or because the traveling speed is slow. Accordingly, an error in the traveling distance is likely to increase. However, when the moving distance is used as the trigger, the moving distance in a single interval can be set as a certain amount of distance (distance enough to allow the error). Accordingly, precision in calculation of a step (or a traveling speed) is improved, and precision of the generated correspondence table is improved.

Further, according to an embodiment of the present disclosure, there is provided an information processing method including acquiring a first value indicating a walking tempo of a user who is walking, calculating a second value indicating a step or a traveling speed of the user by using movement of a predetermined distance by the user as a trigger, and learning a correspondence between the first value and the second value by using the second value calculated.

Further, according to an embodiment of the present disclosure, there is a program causing a computer to function as an information processing apparatus including an absolute position acquiring section that acquires an absolute position of a user, an acquiring section that acquires a first value indicating a walking tempo of the user who is walking, a calculation section that calculates a second value indicating a step or a traveling speed of the user by using, as a trigger, movement of a predetermined distance based on the absolute position, and a learning section that learns a correspondence between the first value and the second value by using the second value calculated.

Further, according to an embodiment of the present disclosure, there is a computer readable recording medium storing a program causing a computer to function as an information processing apparatus including an absolute position acquiring section that acquires an absolute position of a user, an acquiring section that acquires a first value indicating a walking tempo of the user who is walking, a calculation section that calculates a second value indicating a step or a traveling speed of the user by using, as a trigger, movement of a predetermined distance based on the absolute position, and a learning section that learns a correspondence between the first value and the second value by using the second value calculated.

Advantageous Effects of Invention

According to the present disclosure, as described above, the precision of a correspondence table used for autonomous navigation during walking is improved.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description will be provided in the order shown below:
1. Overview
2. First Embodiment (Example of Using Absolute Position Acquired for Each Predetermined Distance)
    2-1. Function Configuration
    2-2. Hardware Configuration Example
    2-3. Operation Example
    2-4. Decision of Distance Threshold
    2-5. Autonomous Positioning
    2-6. Effect Example
3. Second Embodiment (Example of Using a Function Identified by Assuming Correlation between Traveling Speed and Walking Tempo)
    3-1. Function Configuration
    3-2. Operation Example
    3-3. Walking Tempo Classification
    3-34. Effect Example
4. Third Embodiment (Example of Combining Configurations of First Embodiment and Second Embodiment)
    4-1. Function Configuration
    4-2. Operation Example
    4-3. Experimental Results
    4-4. About Input Value
    4-5. How to Carry Mobile Terminal

1. Overview

Figure 34:
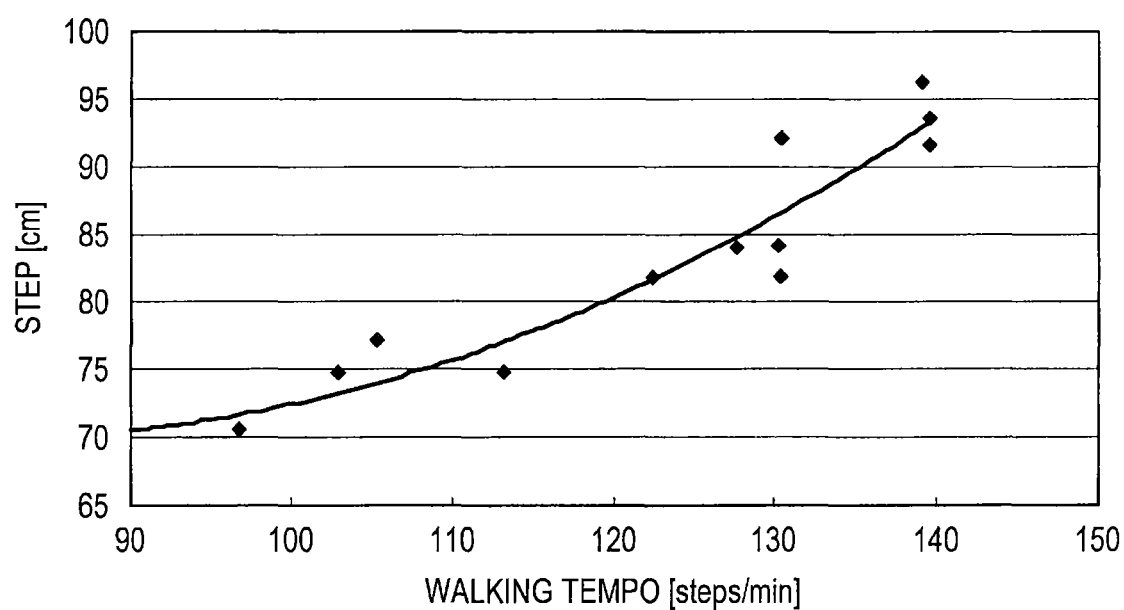
FIG. 34 is an explanatory view showing an example of the correspondence table between the walking tempo and the step.
Figure 35:
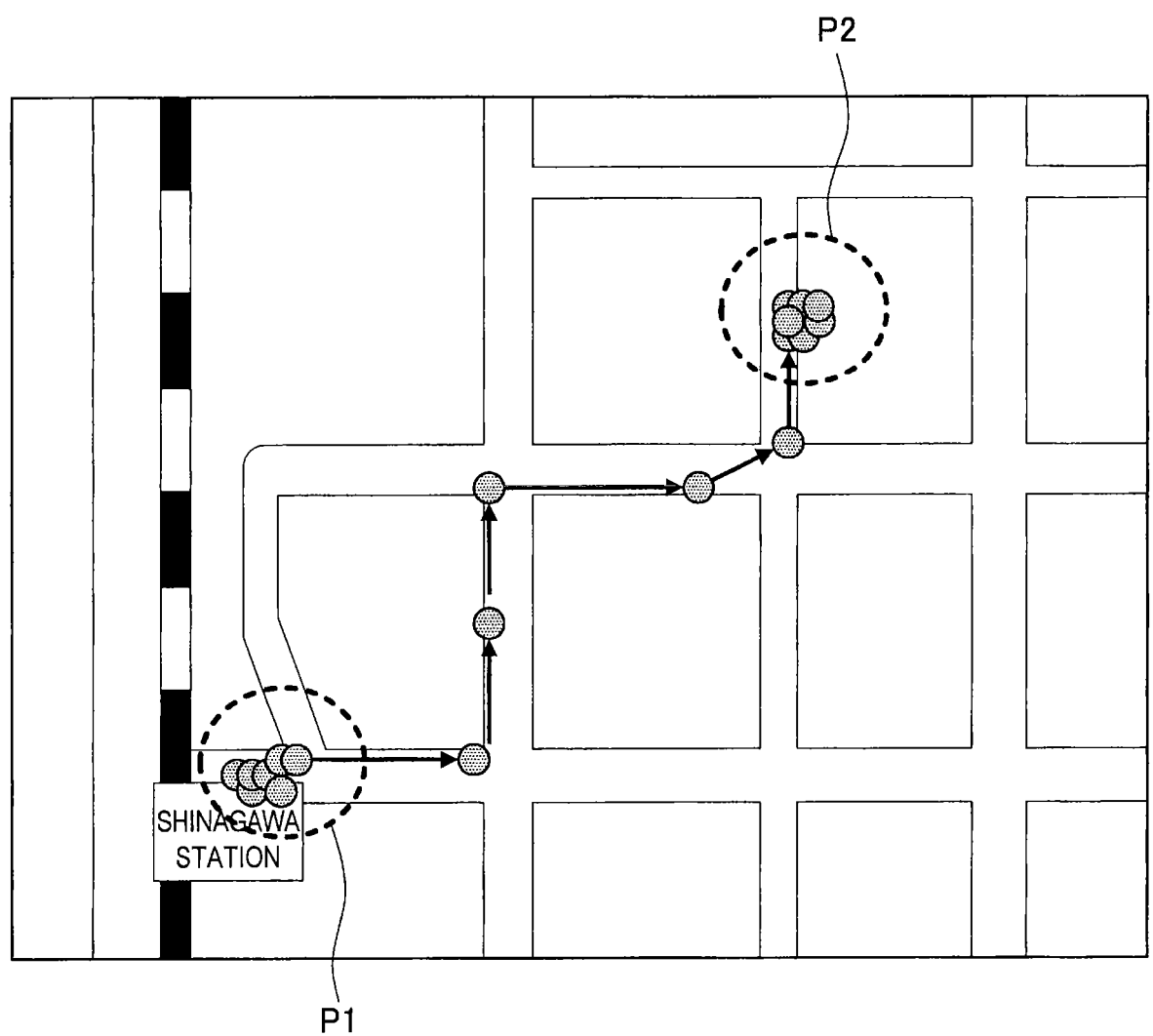
FIG. 35 is an explanatory view illustrating a case when the step is learned by using an absolute position acquired in a fixed time.
Figure 36:
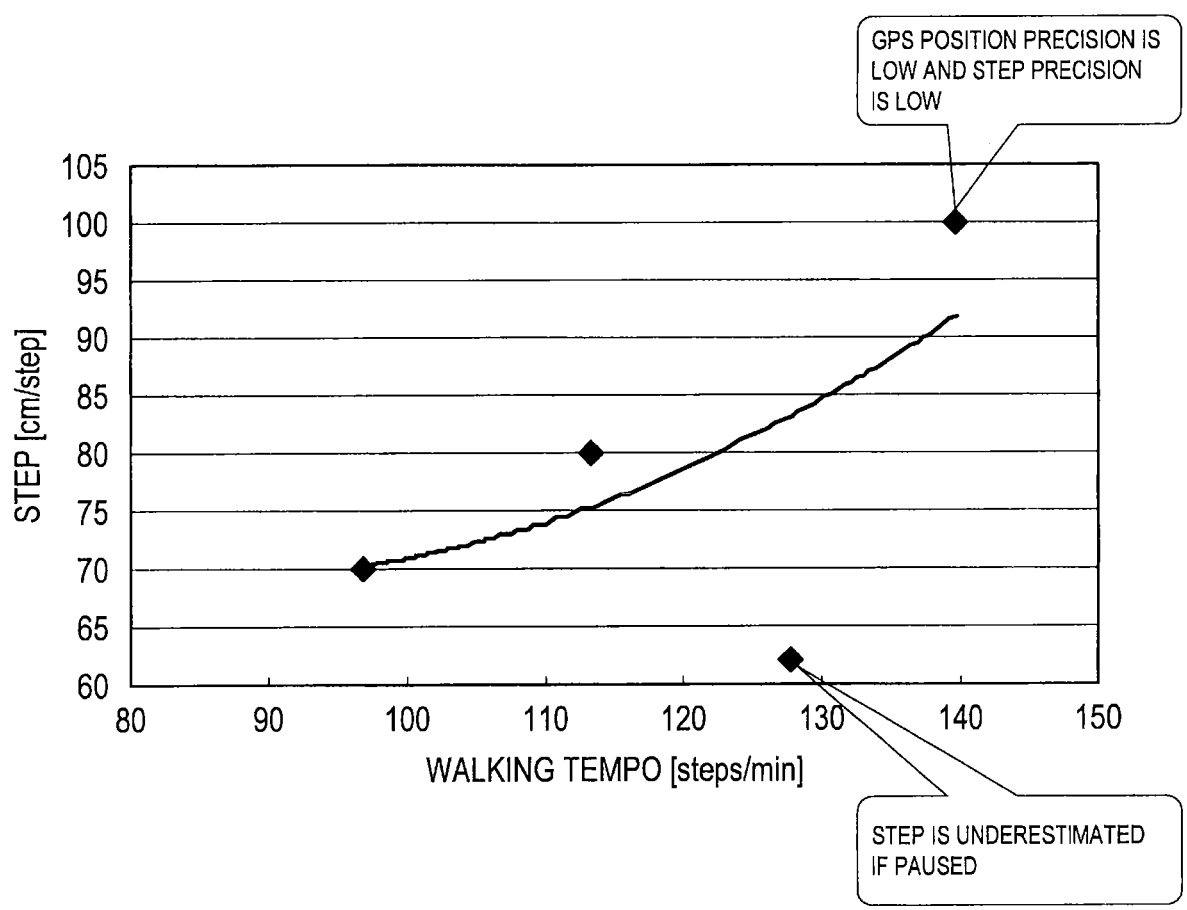
FIG. 36 is an explanatory view showing an example of the correspondence table generated when the step is learned by using the absolute position acquired in the fixed time.
Figure 37:
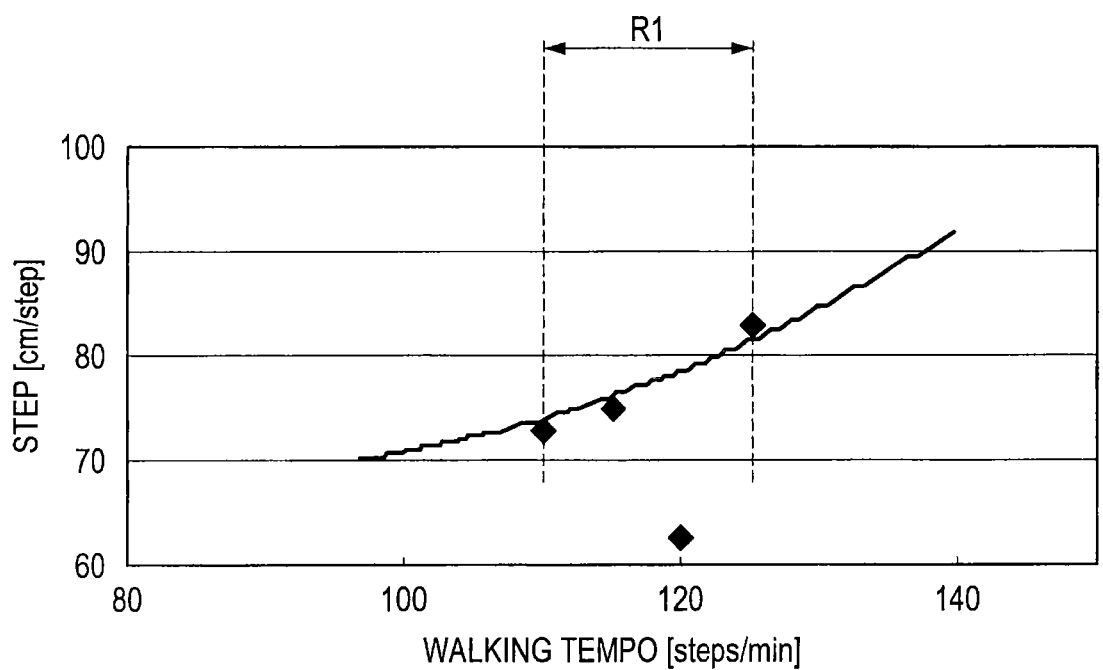
FIG. 37 is an explanatory view showing an example of the correspondence table generated by using an average value of the step and that of the walking tempo.

First, an overview of the present disclosure will be provided with reference to FIGS. 34 to 37. FIG. 34 is an explanatory view showing an example of the correspondence table between the walking tempo and the step. FIG. 35 is an explanatory view illustrating a case when the step is learned by using an absolute position acquired in a fixed time. FIG. 36 is an explanatory view showing an example of the correspondence table generated when the step is learned by using the absolute position acquired in the fixed time. FIG. 37 is an explanatory view showing an example of the correspondence table generated by using an average value of the step and that of the walking tempo.

Terminal apparatuses having a function to acquire position information are widely used as information processing apparatuses including, for example, navigation apparatuses. As methods of acquiring position information in such information processing apparatuses, in addition to absolute positioning using, for example, a positioning satellite like GPS and absolute positioning that calculates the current position by estimating the distance from each base station based on the intensity of reception of a Wifi radio wave from Wifi base stations, autonomous navigation may be used.

The autonomous navigation is a method of acquiring the current position information by calculating a relative position from the point where the last absolute position is determined using information acquired by a sensor or the like. The autonomous navigation may be used when the absolute position cannot be acquired. In addition, the autonomous navigation may be used to correct an error of the absolute position.

A GPS signal cannot be received in a place where, for example, the above space is covered like inside a tunnel and the current position may not be acquired based on GPS positioning. In such a case, the current position information can be acquired even in a place where a GPS signal cannot be received by calculating a relative position from the absolute position acquired immediately before entering the tunnel from information acquired by a sensor.

The relative position can be calculated by using the traveling sped and the direction of movement. The direction of movement can be acquired by using, for example, a function of an electromagnetic compass using a geomagnetic sensor or the like. Particularly in autonomous navigation when moving on foot, a method of using a pedometer can be mentioned as a method of obtaining the speed. In this case, the speed can be obtained by using the relationship of Math (1) shown below that holds using the step k and the walking tempo f of the user.

$$v = k \times f \qquad \text{Math (1)}$$

The walking tempo f is the number of steps per unit time and is calculated by dividing the number of steps acquired by, for example, a pedometer using an acceleration sensor by the time. The step k is different from user to user and is learned in advance.

As the simplest method of learning the step k, the method of dividing the moving distance obtained by GPS positioning by the number of steps while walking can be cited. The value of the step k is different from user to user and at the same time, is different depending on the walking tempo of the user.

Thus, as shown in FIG. 34, the speed can be calculated by using the step in accordance with the value of walking tempo obtained from a pedometer after the value of step in accordance with the walking tempo is learned. Thus, compared with a case when the uniform average step is used regardless of the walking tempo, the precision of the calculated speed is improved.

The present disclosure proposes further improving the precision of the calculated traveling speed in an information processing apparatus that calculates the traveling speed using a correspondence table of the walking tempo and the step. As the first aspect, setting a predetermined distance as a trigger that acquires the moving distance used to calculate the step is proposed. For example, in FIG. 35, the current position of the user acquired at predetermined time intervals is indicated by a circle on the map. In periods P1 and P2 when the user stops or moves within a predetermined range, the moving distance within a predetermined time is small. In a period between P1 and P2, by contrast, the moving distance within the predetermined time is large. An error of the moving distance acquired by absolute positioning decreases relatively with an increasing actual distance. For example, an error of GPS positioning is considered to be about 10 m to 100 m. When the moving distance is acquired at predetermined time intervals, the moving distance in the period is not guaranteed to be a distance allowing to obtain sufficient precision. Thus, as shown in FIG. 36, the precision of the step may be degraded due to low precision of the absolute position. In addition, when the user pauses, the step may be underestimated. Thus, in the first embodiment of the present disclosure shown below, a predetermined distance, instead of a predetermined time, is proposed to set as a trigger to acquire the moving distance.

As a second aspect, generating a correspondence table by assuming a function that holds between a first value (for example, the walking tempo) in accordance with movement of the body of the walking user and a second value (the step of the user or the traveling speed) and identifying the function from values acquired by a sensor or the like is proposed. For example, in FIG. 37, an example of the correspondence table when the average step corresponding to the average walking tempo is calculated is shown. As shown in FIG. 37, a range R1 of the average walking tempo obtained in conditions in which the traveling speed changes is narrower than the actual range. Thus, when moving at a speed different from the normal speed, the precision of the calculated speed is degraded. Therefore, in the second embodiment of the present disclosure shown below, acquiring a highly precise step or traveling speed for each walking tempo, instead of the average value in a predetermined time, is proposed by assuming a function that holds between the first value and the second value.

In the third embodiment of the present disclosure, an embodiment having a configuration combining the first embodiment and the second embodiment will be described.

2. First Embodiment

2-1. Function Configuration

Figure 1:
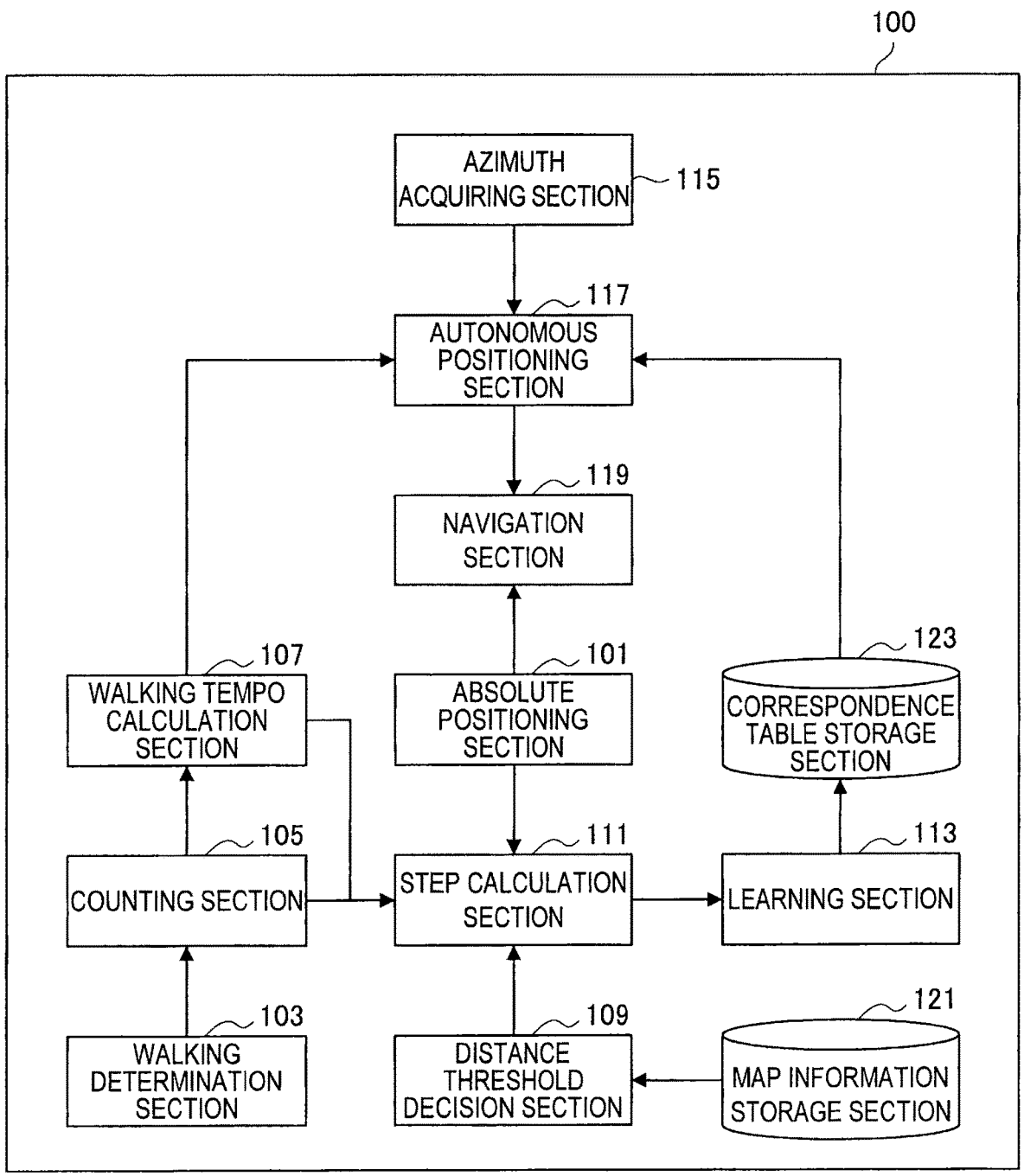
FIG. 1 is a block diagram showing a function configuration of a mobile terminal according to a first embodiment of the present disclosure.

The function configuration of a mobile terminal according to the first embodiment of the present disclosure will be described with reference to FIG. 1. FIG. 1 is a block diagram showing the function configuration of a mobile terminal according to the first embodiment of the present disclosure.

A mobile terminal 100 is an information processing apparatus having an autonomous navigation function while walking. The mobile terminal 100 may be, for example, an information processing apparatus such as a mobile phone, PDA (Personal Digital Assistants), smartphone, mobile music reproducing apparatus, mobile video processing apparatus, mobile game machine, mobile PC (Personal Computer) (including a notebook PC and a tablet PC), and navigation apparatus including PND (Personal Navigation Device). In the description of the present embodiment below, a user carrying the mobile terminal 100 is simply called a user.

The mobile terminal 100 mainly includes an absolute positioning section 101, a walking determination section 103, a counting section 105, a walking tempo calculation section 107, a distance threshold decision section 109, a step calculation section 111, a learning section 113, an azimuth acquiring section 115, an autonomous positioning section 117, a navigation section 119, a map information storage section 121, and a correspondence table storage section 123.

(Absolute Positioning Section 101)

The absolute positioning section 101 has a function of acquiring the absolute position of the user. The absolute positioning section 101 may be, for example, a GPS antenna and a GPS processing section that processes a GPS signal received by the GPS antenna. Alternatively, the absolute positioning section 101 may be a Wifi antenna that receives a Wifi radio wave from a plurality of base stations and a position calculation section that calculates the current position based on the principle of triangulation by estimating the distance from each base station based on the intensity reception of the Wifi radio wave and using the distance to each base station and the position of each base station.

(Walking Determination Section 103)

The walking determination section 103 has a function of determining whether or not the user is moving on foot. The walking determination section 103 can use, for example, a sensor that detects vibration such as an acceleration sensor. While the word walking is used here, the walking determination section 103 can determine a state in which the user is moving by running also as a state of movement on foot.

(Counting Section 105)

The counting section 105 has a function of counting the number of steps needed for the user to move and the traveling time. When the walking determination section 103 determines that the user is moving on foot, the counting section 105 can count the number of steps and the traveling time. Only by counting the traveling time only in a state in which the user is determined to be moving on foot, the counting section 105 can exclude a period when the user pauses from the traveling time.

(Walking Tempo Calculation Section 107)

The walking tempo calculation section 107 has a function of calculating the walking tempo of the user by using the number of steps and the traveling time counted by the counting section 105. The walking tempo calculation section 107 can calculate the walking tempo by converting the number of counted steps into the number of steps per unit time. As described above, the traveling time counted by the counting section 105 excludes a period when the user pauses. Thus, the walking tempo calculation section 107 can calculate a more precise walking tempo. The walking tempo calculated here is an example of the first value in accordance with movement of the user's body. However, the first value is not limited to such an example. For example, the first value may be another value having a correlation with the speed.

(Distance Threshold Decision Section 109)

The distance threshold decision section 109 has a function of deciding a distance threshold as a trigger of step learning. The distance threshold decision section 109 can decide the distance threshold in accordance with the precision of the absolute position acquired by the absolute positioning section 101. The distance threshold decision section 109 can decrease the distance threshold with increasing precision of the absolute position. The distance threshold decision section 109 can also increase the distance threshold with decreasing precision of the absolute position.

The precision of the absolute position may be determined by using, for example, map information stored in the map information storage section 121. For example, the precision of absolute positioning by GPS is degraded in an environment where the upper space is covered, for example, in a downtown high-rise area, below an overpass, or in a forest. On the other hand, the precision of absolute positioning by GPS is improved in a residential street of detached houses, a large park, or a wide road. Thus, when the absolute positioning section 101 determines the absolute position based on GPS, the distance threshold decision section 109 grasps the environment near the current position using map information. Then, the distance threshold decision section 109 may decide the distance threshold by estimating the precision of the absolute position in accordance with what kind of place the current position is. Alternatively, the distance threshold decision section 109 may decide the distance threshold based on other GPS precision indexes. For example, the precision of GPS positioning is different depending on the number of satellites from which the GPS antenna receives a GPS signal (number of positioning satellites that can be captured by the mobile terminal 100).

Thus, the distance threshold decision section 109 may decide the distance threshold based on the number of positioning satellites that can be captured by the mobile terminal 100. The distance threshold decision section 109 may also decide the distance threshold based on the decreasing rate of GPS precision DOP (Dilution of Precision). Further, the precision of GPS positioning is different depending on the intensity of reception of a GPS signal. Thus, the distance threshold decision section 109 may decide the distance threshold based on the intensity of reception of a GPS signal.

When, for example, the absolute positioning section 101 calculates the absolute position based on the intensity of reception of a Wifi radio wave, the precision of the absolute position depends on the number of base stations from which the absolute positioning section 101 receives a Wifi radio wave (number of base stations visible from the mobile terminal 100). Therefore, the distance threshold decision section 109 may decide the distance threshold by estimating the precision of the absolute position based on the number of base stations visible from the mobile terminal 100.

(Step Calculation Section 111)

The step calculation section 111 has a function of calculating the step of the user using movement of the distance threshold decided by the distance threshold decision section 109 as a trigger. The step calculation section 111 can calculate the step of the user by dividing the moving distance by the number of steps each time the user walks the distance threshold. The step calculation section 111 determines that the user has moved the distance threshold based on the absolute position acquired by the absolute positioning section 101 and can acquire the number of steps during movement from the counting section 105 after each movement of the distance threshold. When the step is calculated, the step calculation section 111 can calculate the average walking tempo in the meantime based on the walking tempo acquired from the walking tempo calculation section 107 and associate with the step before supplying the associated average walking tempo to the learning section 113.

(Learning Section 113)

The learning section 113 has a function of learning the correspondence between the walking tempo and the step. The learning section 113 can generate a correspondence table of the walking tempo and the step and cause the correspondence table storage section 123 to store the correspondence table.

(Azimuth Acquiring Section 115)

The azimuth acquiring section 115 has a function of acquiring information about the azimuth in which the user is heading. For example, the azimuth acquiring section 115 may use a geomagnetic sensor.

(Autonomous Positioning Section 117)

The autonomous positioning section 117 has a function of acquiring the current position information by calculating a relative position based on information acquired by a sensor or the like. The autonomous positioning section 117 can calculate a relative position from a specific point based on the azimuth in which the user is heading and the traveling speed. Then, the autonomous positioning section 117 can set the point obtained after movement of the relative position from the specific point as the current position information. The specific point may be, for example, a point where the last absolute position is acquired by the absolute positioning section 101. More specifically, the autonomous positioning section 117 can calculate a relative position based on the azimuth in which the user is heading acquired by the azimuth acquiring section 115, the current walking tempo of the user acquired by the walking tempo calculation section 107, and the correspondence table of the walking tempo and the step stored in the correspondence table storage section 123. When the current walking tempo of the user is acquired, the autonomous positioning section 117 refers to the correspondence table to acquire information about the step associated with the walking tempo. Then, the autonomous positioning section 117 can calculate the traveling speed by multiplying the step by the walking tempo. The autonomous positioning section 117 acquires the current position information by calculating a relative position based on the traveling speed and the azimuth. When, for example, position information cannot be acquired by the absolute positioning section 101, the autonomous positioning section 117 may calculate the current position information.

(Navigation Section 119)

The navigation section 119 has a function of guiding the user from the current position to a predetermined point. The navigation section 119 can acquire position information of the current position from, for example, the absolute positioning section 101. The navigation section 119 can also acquire position information of the current position from the autonomous positioning section 117.

(Map Information Storage Section 121)

The map information storage section 121 has a function of storing map information. The map information stored here may contain, for example, in addition to topographic data, road network data and POI (Point Of Interest) information. The map information may be stored in the map information storage section 121 in advance. Alternatively, the map information may be stored in the map information storage section 121 via a communication path or a removable storage medium when appropriate.

(Correspondence Table Storage Section 123)

The correspondence table storage section 123 has a function of storing a correspondence table generated by the learning section 113. The correspondence table has information associating the step of the user calculated by, for example, the step calculation section 111 with the walking tempo when the step is calculated.

It is assumed here that the map information storage section 121 and the correspondence table storage section 123 are separate storage sections, but the present technology is not limited to such an example. The map information storage section 121 and the correspondence table storage section 123 may be realized by an integrated storage apparatus. The map information storage section 121 and the correspondence table 123 are apparatuses for data storage and can include a storage medium, a recording apparatus recording data in the storage medium, a reading apparatus reading data from the storage medium, and a deletion apparatus deleting data recorded in the storage medium. Here, as the storage medium, there may be used a non-volatile memory such as a flash memory, a magnetoresistive random access memory (MRAM), a ferroelectric random access memory (FeRAM), a phase change random access memory (PRAM), and an electronically erasable and programmable read only memory (EEPROM), and a magnetic recording medium such as a hard disk drive (HDD).

Heretofore, one example of the mobile terminal 100 of the present embodiment has been shown. Each of the above structural elements may be configured using general-purpose members or circuits, or may be configured using hardware specialized for the function of each structural element. Further, the function of each structural element may be realized by reading, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out. Hereinafter, there will be described an example of a hardware configuration for realizing the functions of the mobile terminal 100 described above.

Note that there may be produced a computer program for realizing respective functions of the mobile terminal 100 according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

2-2. Hardware Configuration Example

Figure 2:
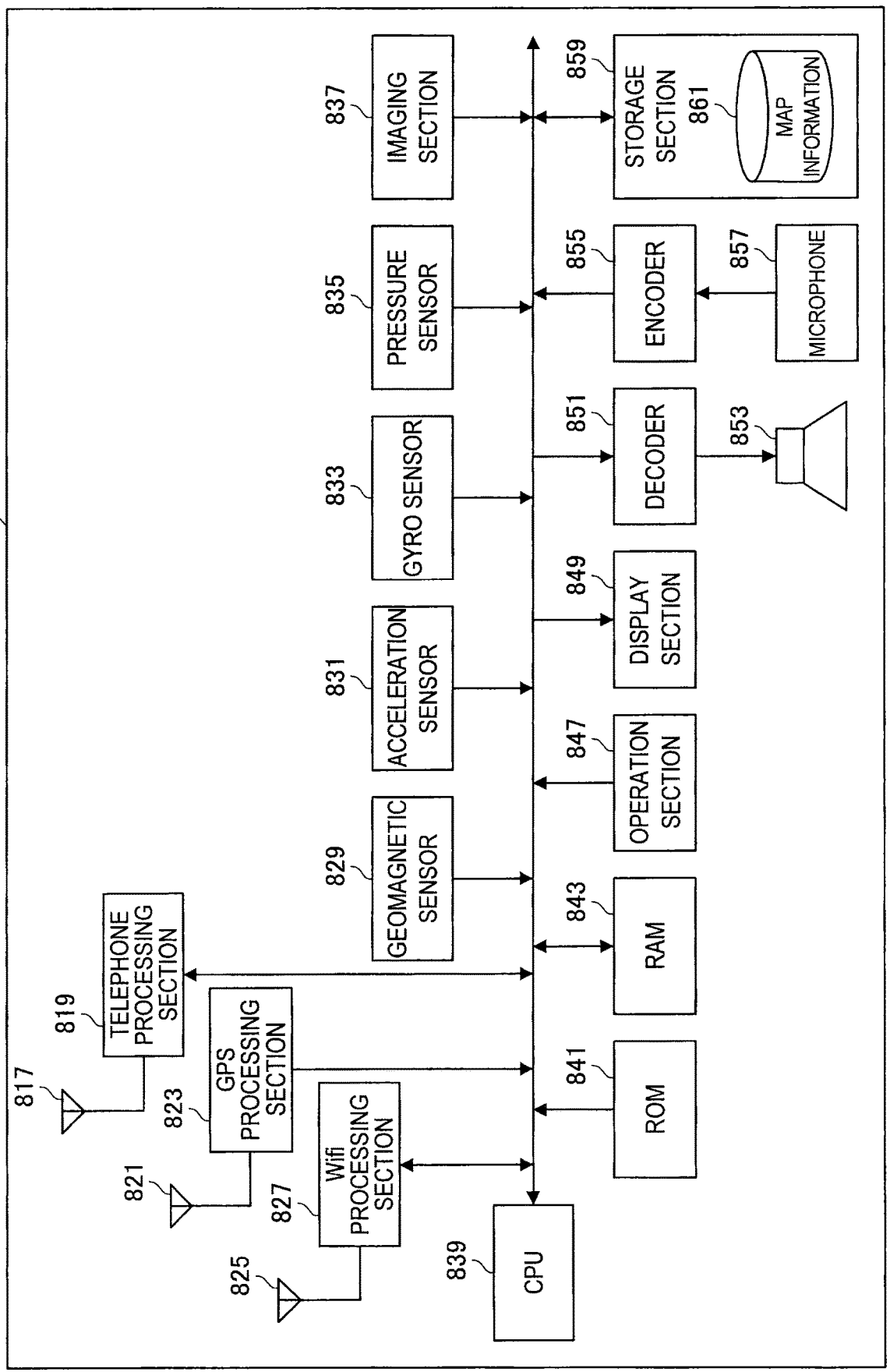
FIG. 2 is a block diagram showing a hardware configuration of a mobile terminal according to an embodiment of the present disclosure.

Next, an example of the hardware configuration of the mobile terminal 100 according to the first embodiment of the present disclosure will be described with reference to FIG. 2. While the description continues as the hardware configuration of the mobile terminal 100 according to the first embodiment of the present disclosure, the configuration can also be applied to a mobile terminal 200 according to the second embodiment of the present disclosure and a mobile terminal 300 according to the third embodiment of the present disclosure. FIG. 2 is a block diagram showing the hardware configuration of a mobile terminal according to an embodiment of the present disclosure.

Figure 9:
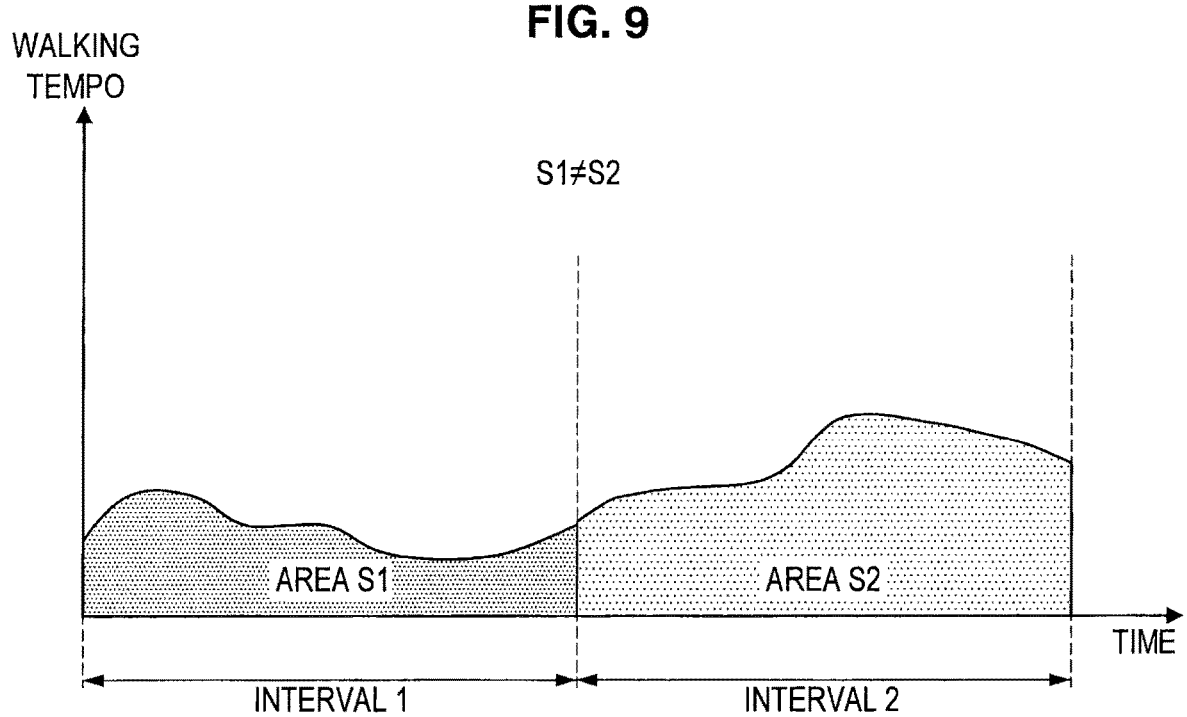
FIG. 9 is an explanatory view illustrating a case when a function can be identified in the creation of a correspondence table of the mobile terminal according to the embodiment.

Here, there will be described an example of the configuration of the mobile terminal 100. Referring to FIG. 9, the mobile terminal 100 includes, for example, a telephone network antenna 817, a telephone processing section 819, a GPS antenna 821, a GPS processing section 823, a WiFi antenna 825, a WiFi processing section 827, a geomagnetic sensor 829, an acceleration sensor 831, a gyro sensor 833, a pressure sensor 835, an imaging section 837, a CPU (Central Processing Unit) 839, a ROM (Read Only Memory) 841, a RAM (Random Access Memory) 843, an operation section 847, a display section 849, a decoder 851, a speaker 853, an encoder 855, a microphone 857, and a storage section 859. The mobile terminal 100 may be a smartphone, for example.

(Telephone Network Antenna 817)

The telephone network antenna 817 is an example of an antenna having a function of establishing a connection via radio waves with a mobile phone network for telephone call and data communication. The telephone network antenna 817 can supply the telephone processing section 819 with a telephone call signal received through the mobile phone network.

(Telephone Processing Section 819)

The telephone processing section 819 has a function of performing various types of signal processing on a signal transmitted/received by the telephone network antenna 817. For example, the telephone processing section 819 can perform various types of processing on an audio signal which is input through the microphone 857 and encoded by the encoder 855, and can supply the telephone network antenna 817 with the audio signal. Further, the telephone processing section 819 can perform various types of processing on an audio signal supplied by the telephone network antenna 817, and can supply the decoder 851 with the audio signal.

(GPS Antenna 821)

The GPS antenna 821 is an example of an antenna which receives a signal from a positioning satellite. The GPS antenna 821 is capable of receiving GPS signals from multiple GPS satellites, and inputs the received GPS signals to the GPS processing section 823.

(GPS Processing Section 823)

The GPS processing section 823 is an example of a calculation section which calculates location information based on the signals received from the positioning satellites. The GPS processing section 823 calculates current location information based on the multiple GPS signals input from the GPS antenna 821, and outputs the calculated location information. To be specific, the GPS processing section 823 calculates positions of the respective GPS satellites based on the orbital data of the GPS satellites, and calculates distances from the respective GPS satellites to the mobile terminal 30 based on the differences between transmission time and reception time of the GPS signals. Then, based on the calculated positions of the respective GPS satellites and the calculated distances from the respective GPS satellites to the mobile terminal 30, a current three-dimensional position can be calculated. Note that the orbital data of GPS satellites used here may be included in the GPS signals, for example. Alternatively, the orbital data of GPS satellites may be acquired from an external server via the communication antenna 825.

(WiFi Antenna 825)

The WiFi antenna 825 is an antenna having a function of transmitting/receiving a communication signal to/from a wireless local area network (LAN) communication network in accordance with the WiFi specification, for example. The WiFi antenna 825 can supply the WiFi processing section 827 with the received signal.

(WiFi Processing Section 827)

The WiFi processing section 827 has a function of performing various types of signal processing on the signal supplied by the WiFi antenna 825. The WiFi processing section 827 can supply the CPU 839 with a digital signal generated from the supplied analog signal.

(Geomagnetic Sensor 829)

The geomagnetic sensor 829 is a sensor for detecting geomagnetism as a voltage value. The geomagnetic sensor 829 may be a 3-axis geomagnetic sensor which detects geomagnetism in the X-axis direction, the Y-axis direction, and the Z-axis direction. The geomagnetic sensor 829 can supply the CPU 839 with the detected geomagnetic data.

(Acceleration Sensor 831)

The acceleration sensor 831 is a sensor for detecting acceleration as a voltage value. The acceleration sensor 831 may be a 3-axis acceleration sensor which detects acceleration along the X-axis direction, acceleration along the Y-axis direction, and acceleration along the Z-axis direction. The acceleration sensor 831 can supply the CPU 839 with the detected acceleration data.

(Gyro Sensor 833)

The gyro sensor 833 is a measuring instrument for detecting an angle or an angular velocity of an object. The gyro sensor 833 may be a 3-axis gyro sensor which detects a variable velocity (angular velocity) of the rotation angle around each of the X-axis, the Y-axis, and the Z-axis as a voltage value. The gyro sensor 833 can supply the CPU 839 with the detected angular velocity data.

(Pressure Sensor 835)

The pressure sensor 835 is a sensor for detecting the surrounding pressure as a voltage value. The pressure sensor 835 detects a pressure at a predetermined sampling frequency, and can supply the CPU 839 with the detected pressure data.

(Imaging Section 837)

The imaging section 837 has a function of capturing a still image or a moving image via a lens in accordance with control of the CPU 839. The imaging section 837 may cause the storage section 859 to store the captured image.

(CPU 839)

The CPU 839 functions as an arithmetic processing unit and a control unit, and controls the overall operation inside the mobile device 10 in accordance with various programs. Further, the CPU 839 may be a microprocessor. The CPU 839 can realize various functions in accordance with various programs.

(ROM 841, RAM 843)

The ROM 841 can store programs and arithmetic parameters used by the CPU 839. The RAM 843 can temporarily store programs used during execution of the CPU 839 and parameters that appropriately change during the execution thereof.

(Operation section 847)

The operation section 847 has a function of generating an input signal used by a user for performing a desired operation. For example, the operation section 847 may be configured from, for example, an input section for inputting information by the user, such as a touch sensor, a mouse, a keyboard, a button, a microphone, a switch, and a lever, and an input control circuit which generates an input signal based on the input by the user and outputs the generated input signal to the CPU 839.

(Display Section 849)

The display section 849 is an example of an output device, and may be a liquid crystal display (LCD) device, an organic light emitting diode (OLED) display device, or the like. The display section 849 displays a screen to the user, and thereby being able to provide information.

(Decoder 851, Speaker 853)

The decoder 851 has a function of performing decoding, analog conversion, and the like of input data in accordance with the control of the CPU 839. The decoder 851 can perform decoding, analog conversion, and the like of audio data input through the telephone network antenna 817 and the telephone processing section 819, and can output an audio signal to the speaker 853, for example. Further, the decoder 851 can perform decoding, analog conversion, and the like of audio data input through the WiFi antenna 825 and the WiFi processing section 827, and can output an audio signal to the speaker 853, for example. The speaker 853 can output the audio based on the audio signal supplied from the decoder 851.

(Encoder 855, Microphone 857)

The encoder 855 has a function of performing digital conversion, encoding, and the like of input data in accordance with the control of the CPU 839. The encoder 855 can perform digital conversion, encoding, and the like of an audio signal input from the microphone 857, and can output audio data. The microphone 857 can collect audio and output the audio as an audio signal.

(Storage Section 859)

The storage section 859 is a device for storing data, and can include a storage medium, a recording device for recording data in the storage medium, a reading device for reading the data from the storage medium, and a deletion device for deleting the data recorded in the storage medium. Here, as the storage medium, there may be used a non-volatile memory such as a flash memory, a magnetoresistive random access memory (MRAM), a ferroelectric random access memory (FeRAM), a phase change random access memory (PRAM), and an electronically erasable and programmable read only memory (EEPROM), and a magnetic recording medium such as a hard disk drive (HDD). The storage section 857 may store a map information 861. In addition, the storage section 857 may store a correspondence table.

2-3. Operation Example

Figure 3:
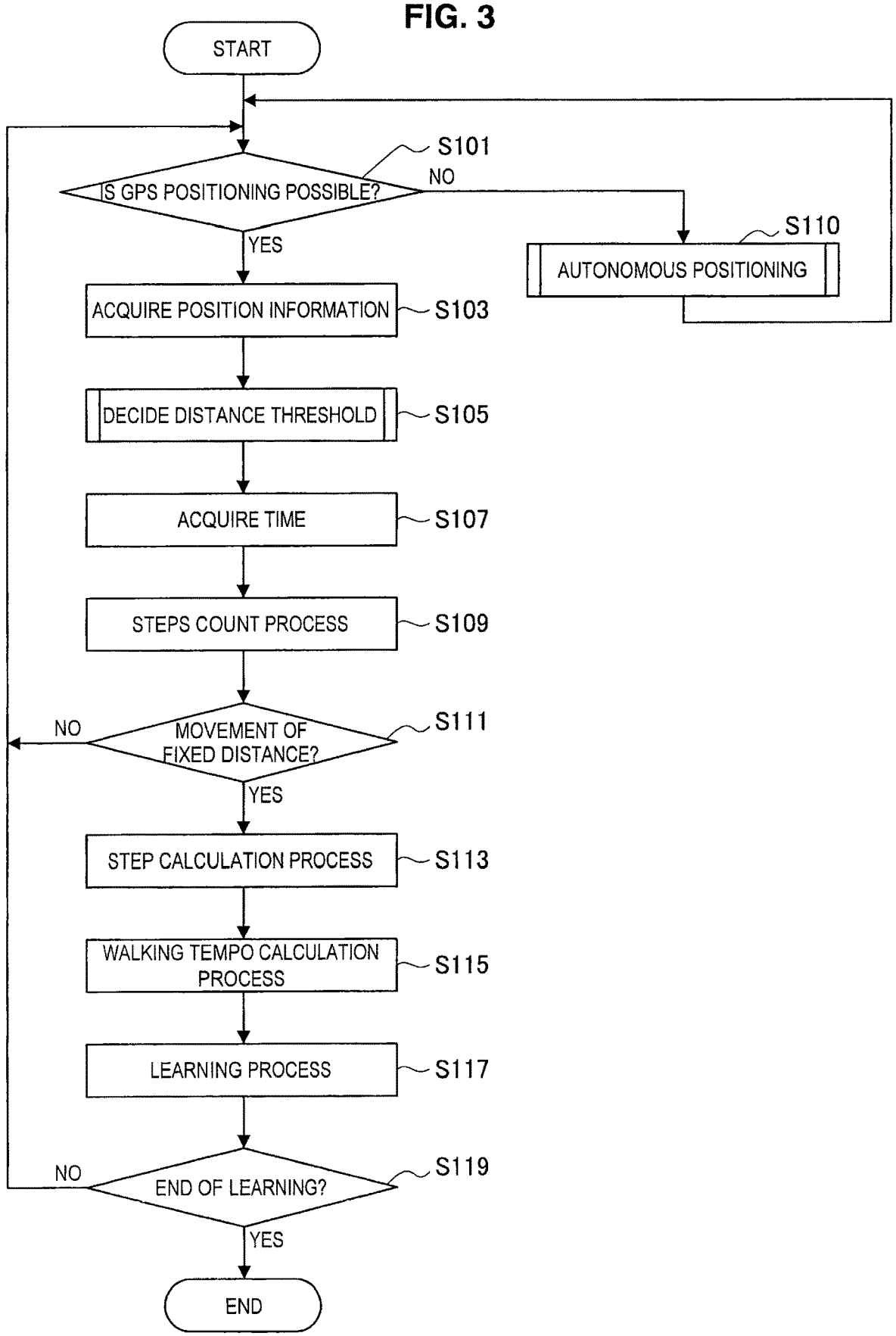
FIG. 3 is a flow chart showing an example of an operation of the mobile terminal according to the first embodiment of the present disclosure.

Next, the operation of the mobile terminal 100 according to the first embodiment of the present disclosure will be described with reference to FIG. 3. FIG. 3 is a flow chart showing an example of the operation of the mobile terminal according to the first embodiment of the present disclosure.

First, the mobile terminal 100 determines whether GPS positioning is possible (S101). If the GPS positioning is determined to be possible, the absolute positioning section 101 of the mobile terminal 100 acquires the current position information (S103). Then, the distance threshold decision section 109 decides the distance threshold (S105). The decision of the distance threshold will be described in detail later.

Then, the counting section 105 acquires the current time information (S107). Then, the counting section 105 counts the elapsed time from this point and also starts a steps count process (S109). The step calculation section 111 determines whether a fixed distance is moved after the position information is acquired in step S103 (S111). The distance threshold decided in step S105 is used as the fixed distance used here. The steps count process in step S109 is continued until determined in step S111 that the fixed distance is moved.

Then, the user is determined to have moved the fixed distance, next the step calculation section 111 performs a step calculation process (S113). More specifically, the step calculation section 111 can calculate the step as a moving distance per step by dividing the moving distance by the number of steps. Here, the step calculation section 113 causes the walking tempo calculation section 107 to calculate the walking tempo during the movement (S115). The walking tempo calculated here may be, for example, the average walking tempo while moving the moving distance.

Then, the learning section 113 learns the correspondence between the step and the walking tempo using the step calculated in step S113 and the walking tempo calculated in step S115 (S117). Next, the learning section 113 determines whether to end learning (S119). If it is determined in step S119 that learning should end, the present flow is terminated. On the other hand, if it is determined in step S119 that learning should not end, the process continues by returning to step S101. If, in step S101, GPS positioning is determined to be impossible, the autonomous positioning section 117 of the mobile terminal 100 can perform autonomous positioning (S110).

2-4. Decision of Distance Threshold

Figure 4:
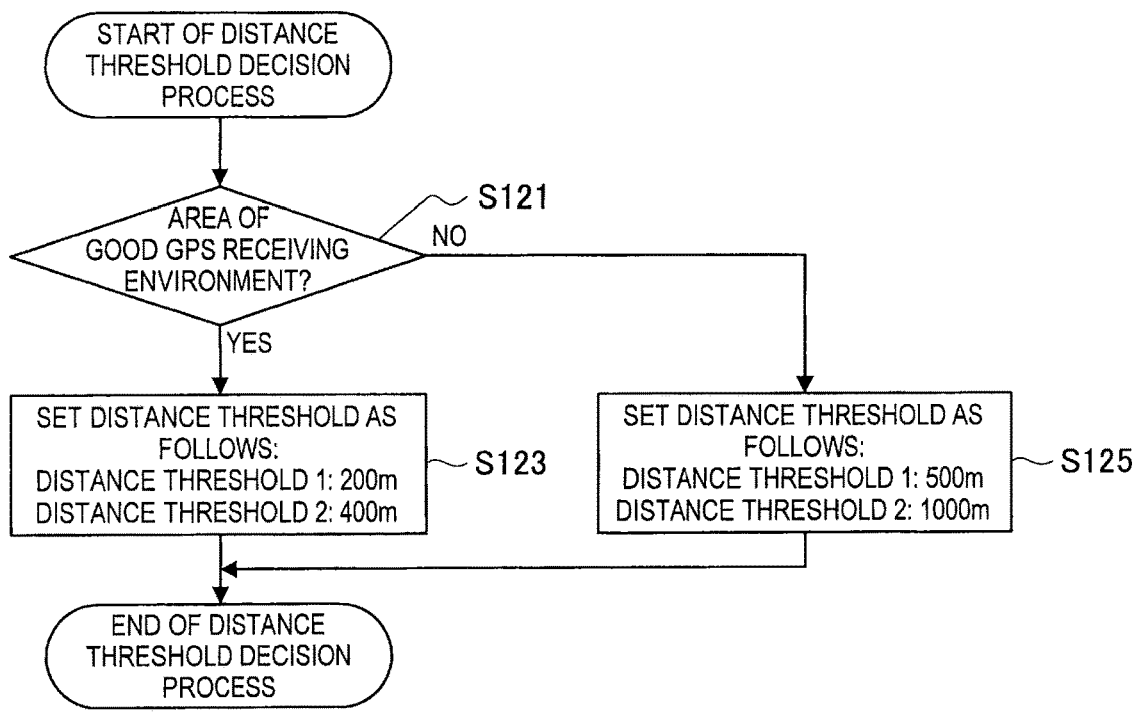
FIG. 4 is a flow chart showing an example of the operation of a distance threshold decision process of the mobile terminal according to the embodiment.
Figure 5:
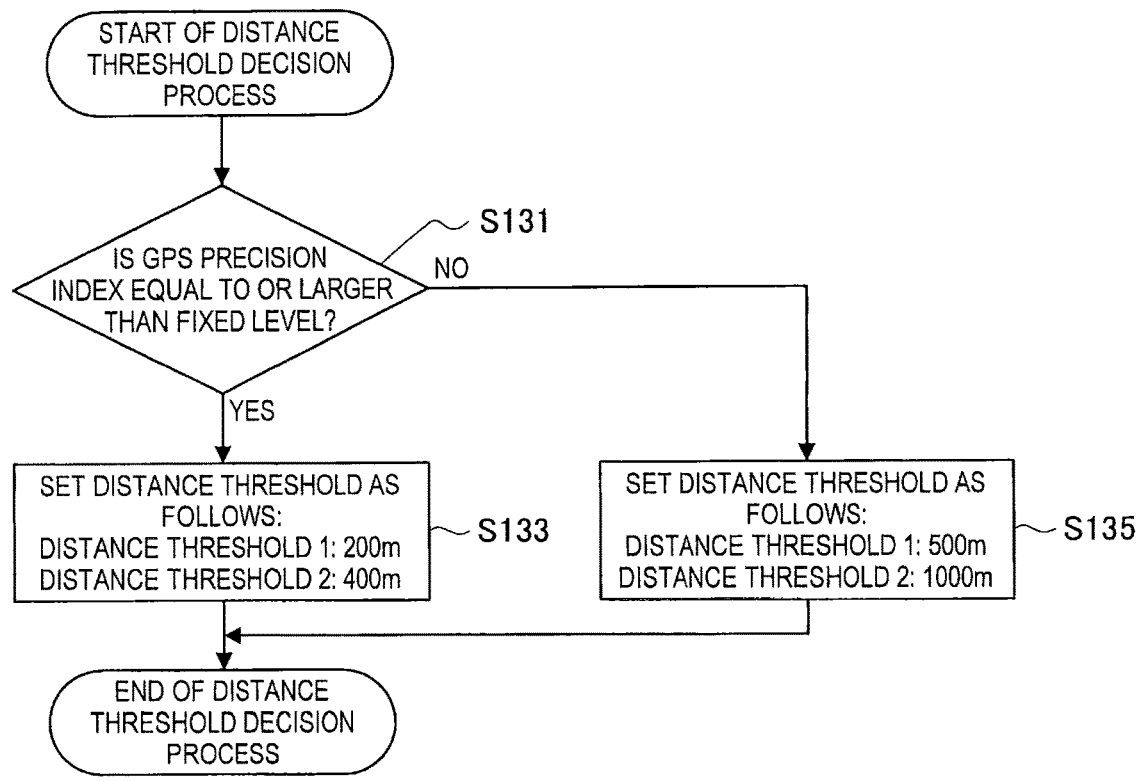
FIG. 5 is a flow chart showing another example of the operation of the distance threshold decision process of the mobile terminal according to the embodiment.

The decision of the distance threshold shown in step S105 in FIG. 3 will be described in detail with reference to FIGS. 4 and 5. FIG. 4 is a flow chart showing an example of the operation of a distance threshold decision process of the mobile terminal according to the embodiment. FIG. 5 is a flow chart showing another example of the operation of the distance threshold decision process of the mobile terminal according to the embodiment.

First, referring to FIG. 4, the distance threshold decision section 109 determines whether the current position is an area where the GPS receiving environment is good (S121). The distance threshold decision section 109 can determine step S121 by using map information. The distance threshold decision section 109 grasps conditions around the current position by using the map information. For example, the distance threshold decision section 109 may determine to be an area of a good GPS receiving environment if the area around the current position is a residential street of detached houses, a large park, or a wide road. The distance threshold decision section 109 may determine to be an area of a poor GPS receiving environment if the area around the current position is a downtown high-rise area, an overpass, or a forest.

If it is determined in step S121 that the current position is a good GPS receiving environment, the distance threshold decision section 109 can set a first distance threshold to 200 m and a second distance threshold to 400 m (S123). On the other hand, if it is determined in step S121 that the current position is a poor GPS receiving environment, the distance threshold decision section 109 can set the first distance threshold to 500 m and the second distance threshold to 1000 m (S125).

In the foregoing, a method of deciding the distance threshold by using map information is described with reference to FIG. 4, but the present technology is not limited to such an example. Next, a method of deciding the distance threshold based on a GPS precision index will be described with reference to FIG. 5.

First, the distance threshold decision section 109 determines whether the GPS precision index is equal to or higher than a fixed level (S131). As the GPS precision index, for example, the number of captured positioning satellites, DOP, the intensity of reception of a GPS signal can be cited. If the precision index is equal to or higher than a fixed level, the distance threshold decision section 109 can set the first distance threshold to 200 m and the second distance threshold to 400 m (S133). On the other hand, if the precision index is not equal to or higher than a fixed level, the distance threshold decision section 109 can set the first distance threshold to 500 m and the second distance threshold to 1000 m (S135).

A case when the absolute positioning section 101 performs GPS positioning is taken as an example, but the present technology is not limited to such an example. If, for example, the absolute positioning section 101 determines the position by a method other than the GPS positioning, the distance threshold may be decided based on appropriate positioning precision in accordance with the positioning method. The distance thresholds shown here are only an example and various values may naturally be used in accordance with other environments. When the positioning precision is high, a smaller distance threshold is set than when the positioning precision is low. Here, the distance threshold is selected from two levels and decided, but the present technology is not limited to such an example. Various values may be taken in accordance with positioning precision.

2-5. Autonomous Positioning

Next, an autonomous positioning process shown in step S110 in FIG. 3 will be described with reference to FIG. 6.

Figure 6:
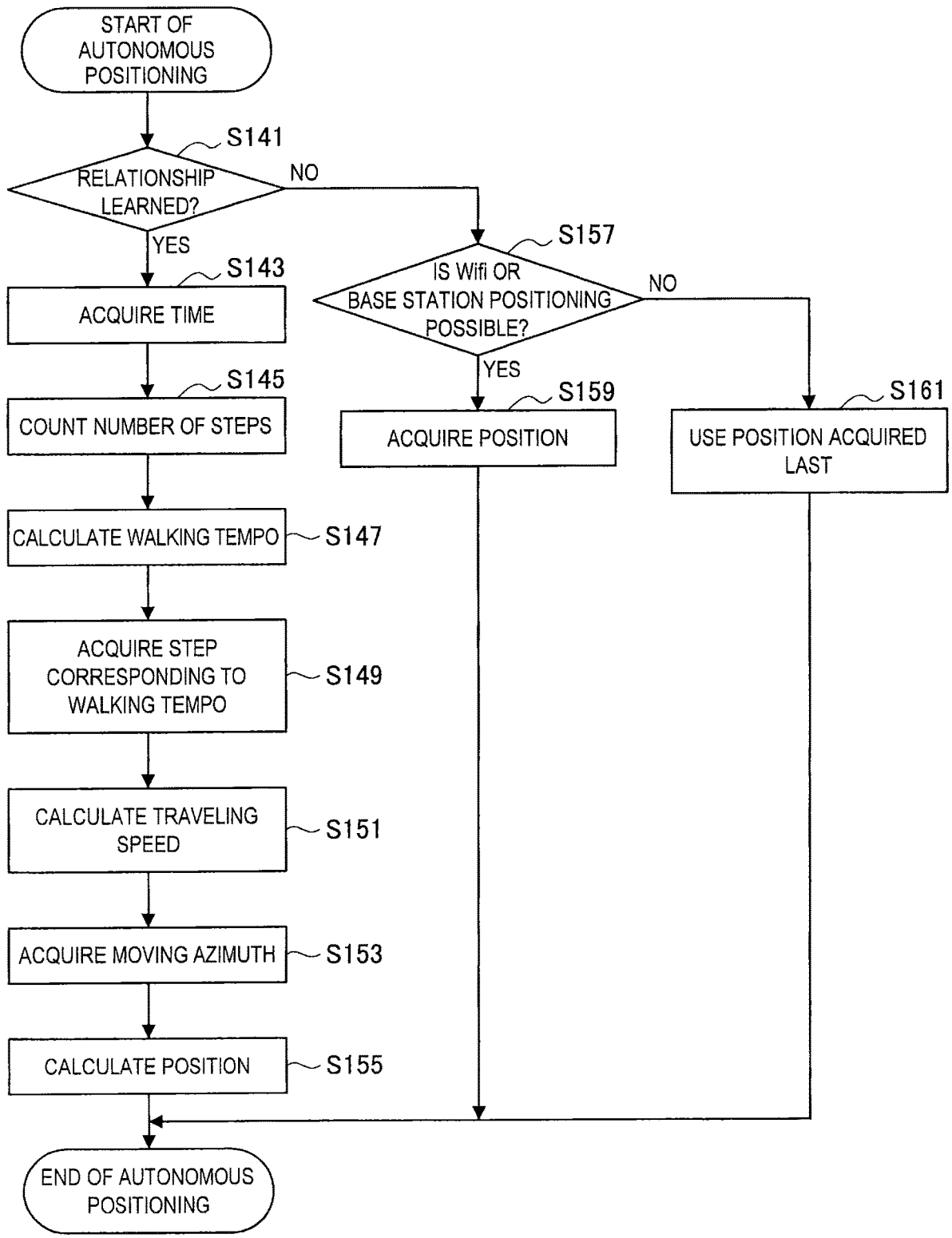
FIG. 6 is a flow chart showing an example of an autonomous positioning operation of the mobile terminal according to the embodiment.

FIG. 6 is a flow chart showing an example of an autonomous positioning operation of the mobile terminal according to the embodiment.

First, the autonomous positioning section 117 determines whether the relationship between the walking tempo and the step has been learned (S141). The autonomous positioning section 117 can make the determination based on, for example, whether a correspondence table is stored in the correspondence table storage section 123. If it is determined in step S141 that the relationship between the walking tempo and the step has been learned, the autonomous positioning section 117 acquires the time (S143). Then, the autonomous positioning section 117 causes the counting section 105 to count the number of steps after the time is acquired (S145). Then, the autonomous positioning section 117 causes the walking tempo calculation section 107 to calculate the walking tempo (S147).

The autonomous positioning section 117 acquires the step corresponding to the walking tempo calculated in step S147 by referring to a correspondence table (S149). Then, the autonomous positioning section 117 calculates the traveling speed by using the step acquired in step S149 (S151). The traveling speed can be calculated by multiplying the step by the walking tempo. Then, the autonomous positioning section 117 acquires the azimuth in which the user is moving from the azimuth acquiring section 115 (S153). The autonomous positioning section 117 calculates the current position based on the traveling speed calculated in step S151 and a moving azimuth acquired in step S153 (S155). More specifically, the autonomous positioning section 117 calculates a relative position from the point indicated by the absolute position obtained lastly by GPS positioning based on the traveling speed and the moving azimuth. Then, the current position information is calculated by using the absolute position and the relative position.

On the other hand, if it is determined in step S141 that the relationship between the walking tempo and the step has not yet been learned, next the autonomous positioning section 117 determines whether positioning by Wifi or base stations is possible (S157).

2-6. Effect Example

As described above, the mobile terminal 100 according to the first embodiment of the present disclosure uses, instead of the time, the distance as a trigger to calculate the step. By adopting such a configuration, the moving distance as the calculation unit of the step can be a distance to maintain sufficient positioning precision. When the time is used as a trigger, if a time in which the user pauses is included, the moving distance as the calculation unit of the step becomes shorter correspondingly. Thus, the moving distance as the calculation unit may not be able to maintain a sufficient distance and when the positioning precision decreases, the precision of the step sometimes decreases significantly. The configuration in the present embodiment uses movement of the predetermined distance threshold by the user as a trigger and thus, a decrease in the precision of the step can be reduced.

The distance threshold is made variable in accordance with the positioning precision. More specifically, the distance threshold may be set shorter when the positioning precision is high than when the positioning precision is low. By adopting such a configuration, an appropriate distance threshold can be selected in accordance with the positioning precision. Therefore, the learning precision of correspondence between the walking tempo and the step is improved.

The mobile terminal 100 determines whether the user is walking and includes a walking period as the traveling time. That is, the mobile terminal 100 does not include a time when the user pauses in the traveling time. By adopting such a configuration, the precision of the walking tempo can be prevented from decreasing when the user pauses.

3. Second Embodiment

3-1. Function Configuration

Figure 7:
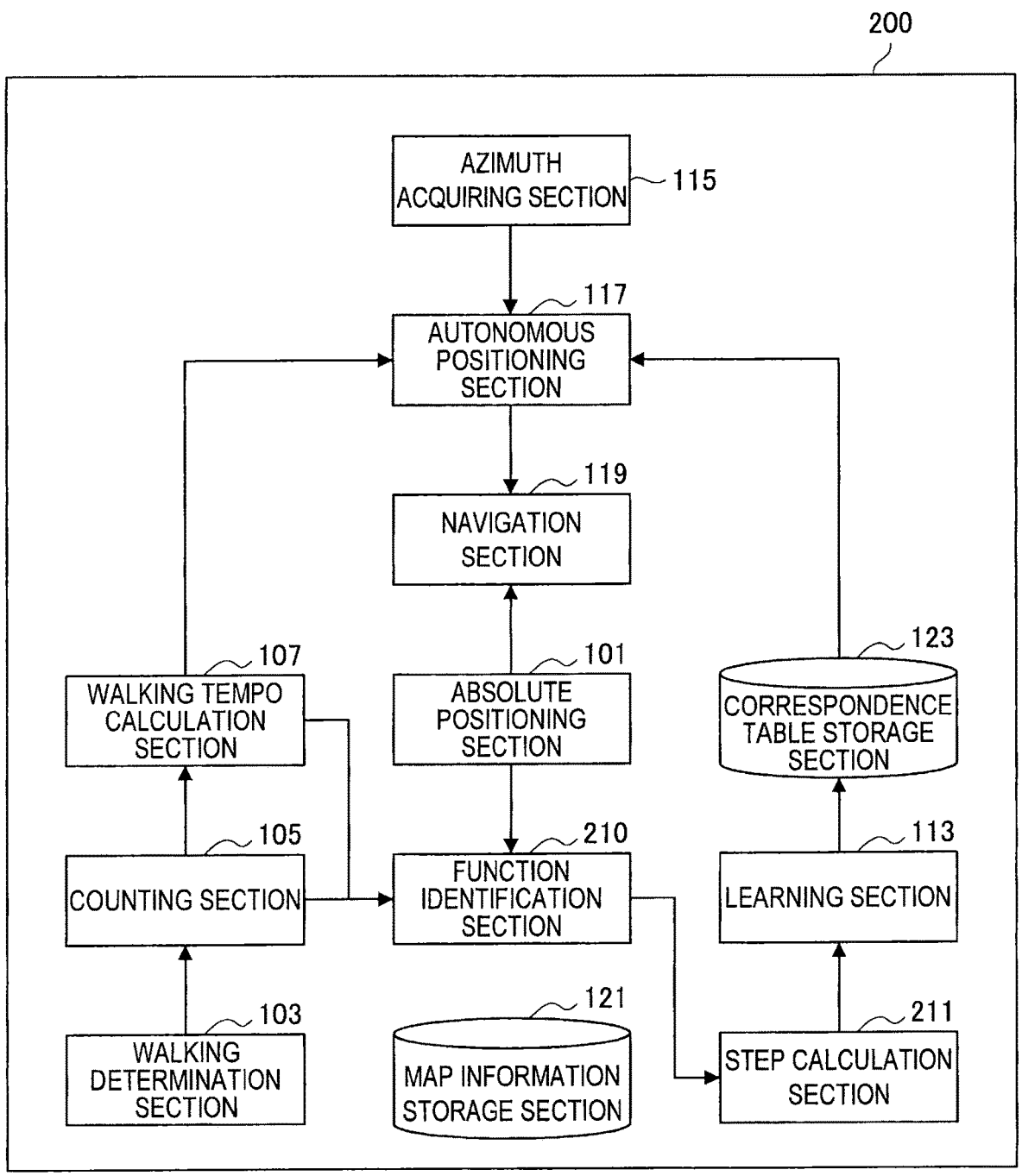
FIG. 7 is a block diagram showing the function configuration of a mobile terminal according to a second embodiment of the present disclosure.
Figure 8:
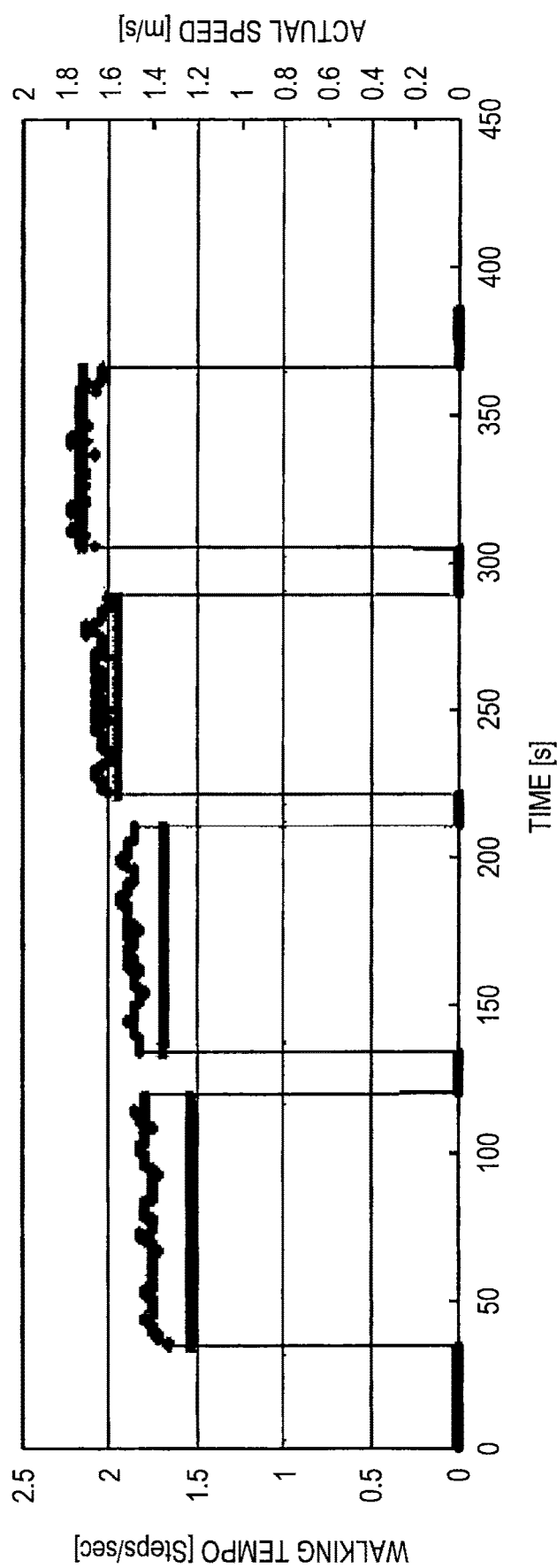
FIG. 8 is an explanatory view illustrating an outline function of the mobile terminal according to the embodiment.
Figure 10:
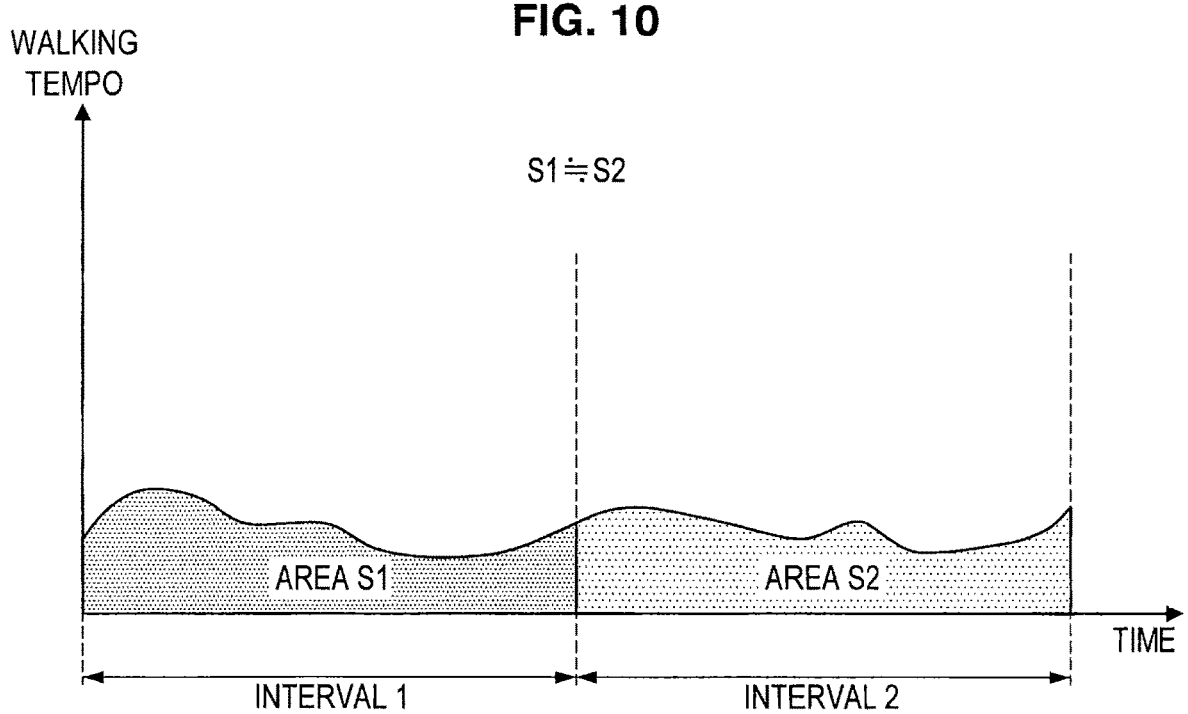
FIG. 10 is an explanatory view illustrating a case when the function cannot be identified in the creation of a correspondence table of the mobile terminal according to the embodiment.

Next, the function configuration of a mobile terminal according to the second embodiment of the present disclosure will be described with reference to FIGS. 7 to 10. FIG. 7 is a block diagram showing the function configuration of a mobile terminal according to the second embodiment of the present disclosure. FIG. 8 is an explanatory view illustrating an outline function of the mobile terminal according to the embodiment. FIG. 9 is an explanatory view illustrating a case when a function can be identified in the creation of a correspondence table of the mobile terminal according to the embodiment. FIG. 10 is an explanatory view illustrating a case when the function cannot be identified in the creation of a correspondence table of the mobile terminal according to the embodiment.

A mobile terminal 200 is an information processing apparatus having an autonomous navigation function while walking. The mobile terminal 200 may be, for example, an information processing apparatus such as a mobile phone, PDA (Personal Digital Assistants), smartphone, mobile music reproducing apparatus, mobile video processing apparatus, mobile game machine, mobile PC (Personal Computer) (including a notebook PC and a tablet PC), and navigation apparatus including PND (Personal Navigation Device). In the description of the present embodiment below, a user carrying the mobile terminal 200 is simply called a user.

The mobile terminal 200 is an information processing apparatus having a function of learning the relationship between the walking tempo and the traveling speed or step by assuming a function that holds between the walking tempo and the traveling speed and identifying coefficients contained in the function.

The mobile terminal 200 mainly includes the absolute positioning section 101, the walking determination section 103, the counting section 105, the walking tempo calculation section 107, a function identification section 210, a step calculation section 211, the learning section 113, the azimuth acquiring section 115, the autonomous positioning section 117, the navigation section 119, the map information storage section 121, and the correspondence table storage section 123.

The configuration of the mobile terminal 200 according to the present embodiment partially overlaps with the configuration of the mobile terminal 100 according to the first embodiment of the present disclosure. Thus, the description of elements similar to those of the mobile terminal 100 is omitted and differences will mainly be described.

(Function Identification Section 210)

The function identification section 210 has a function of identifying a function assumed to hold between the walking tempo and the traveling speed. The assumption that there is a correlation between the walking tempo and the speed will be described with reference to FIG. 8. FIG. 8 shows the value of the actually measured speed and the walking tempo detected during measurement. As is evident from FIG. 8, there is a correlation between the walking tempo and the speed.

It is assumed here that, for example, the relationship of Math (2) shown below holds between the walking tempo f and the traveling speed v.

$$v = a \times \hat{f} + b \quad \ldots \text{数式} \quad (2)$$

Math (2)

a and b are learning coefficients.

It is assumed here that there is a linear correlation between the walking tempo f and the traveling speed v, but the present technology is not limited to such an example. For example, the second-order or higher-order correlation may be assumed between the walking tempo f and the traveling speed v. Alternatively, a correlation shown by a trigonometric function may be assumed between the walking tempo f and the traveling speed v.

From the above Math (2), the relationship of Math (3) shown below can be said to hold among the moving distance X, the walking tempo f, and the traveling time T.

Math (3)

$$\hat{X} = \sum^{t} v$$
$$= \sum^{t} \left( a \times \hat{f} + b \right)$$
$$= a \times \sum^{t} \hat{f} + b \times \hat{T} \quad \ldots \text{数式} \quad (3)$$

The moving distance X is acquired based on position information acquired by the absolute positioning section 101. The walking tempo f is calculated by the walking tempo calculation section 107. The traveling time T is counted by the counting section 105. Therefore, the coefficient a and the coefficient b can be calculated by acquiring the values of the moving distance X, the walking tempo f, and the traveling time T of two intervals. The function identification section 210 can classify the walking tempo f and integrate the walking tempo for each class. The classification of the walking tempo f will be described in detail later.

The function identification section 210 can identify the assumed function by acquiring the moving distance X and the traveling time T in every predetermined time and further solving an equation using the integrated walking tempo f to calculate the coefficient a and the coefficient b. However, there are sometimes cases when the coefficient a and the coefficient b cannot be calculated.

For example, if, as shown in FIG. 9, the average tempo is different from interval to interval (integrated values of the walking tempo are different: S1≠S2), the function identification section 210 can solve an equation and identify the function. However, if, as shown in FIG. 10, the average tempo in each interval is approximately the same (integrated values of the walking tempo are approximately the same: S1≈S2), the function identification section 210 cannot solve an equation and identify the function.

For example, the equation to determine the coefficient a and the coefficient b is as follows:

$$m_1 a + m_2 b = m_3 \quad \text{Math (4)}$$

$$n_1 a + n_2 b = n_3 \quad \text{Math (5)}$$

In contrast, a condition under which an equation cannot be solved (=linear dependence) is expressed like the following Math:

Math (6)

$$\frac{m_1}{n_1} - \frac{m_2}{n_2} = 0 \ldots 数式 \quad (6)$$

Because noise is actually contained, the condition allows for a certain margin as shown by Math (7) below.

Math (7)

$$\left|\frac{m_1}{n_1} - \frac{m_2}{n_2}\right| < \Delta \quad (7)$$

ex. $\Delta = 0.5 \ldots$ 数式

Thus, if an equation can be solved, the function identification section 210 supplies the identified function to the step calculation section 211. If an equation cannot be solved, the function identification section 210 can supply information indicating that the function cannot be identified to the step calculation section 211.

(Step Calculation Section 211)

The step calculation section 211 has a function of calculating the step of the user. The step calculation section 211 can calculate the speed at each time by substituting a walking tempo value calculated in the past into the function identified by the function identification section 210. Then, the step at each time can be calculated by using the above Math (1) that holds between the speed v and the step k.

$$v = k \times f \quad \text{Math (1)}$$

When the function identification section 210 cannot identify the function, the step calculation section 211 may calculate the step by using the moving distance and the traveling time. The step calculation section 211 can calculate the step for each class generated by classification of the walking tempo described in detail later.

3-2. Operation Example

Figure 11:
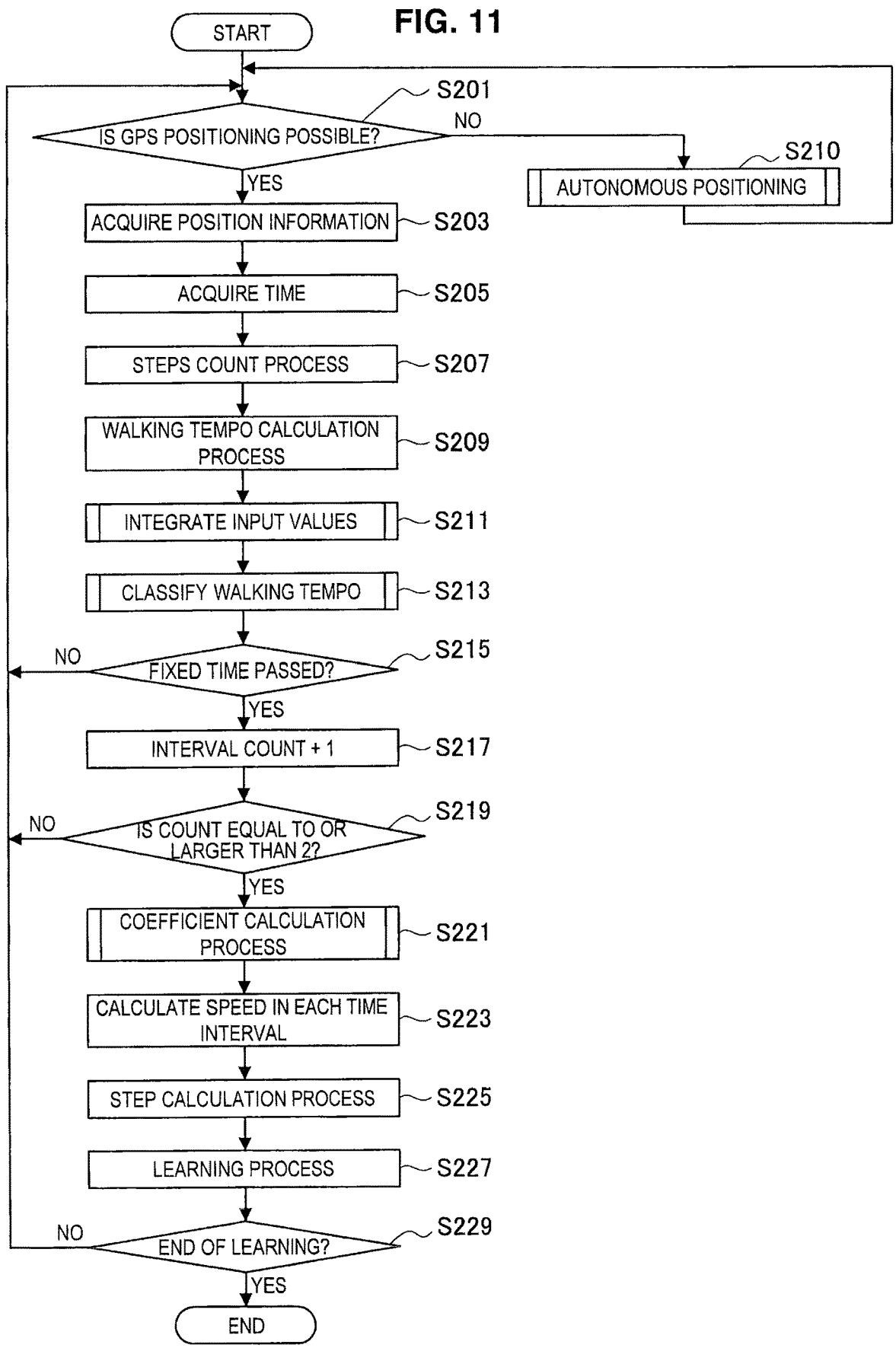
FIG. 11 is a flow chart showing an example of the operation of the mobile terminal according to the embodiment.
Figure 12:
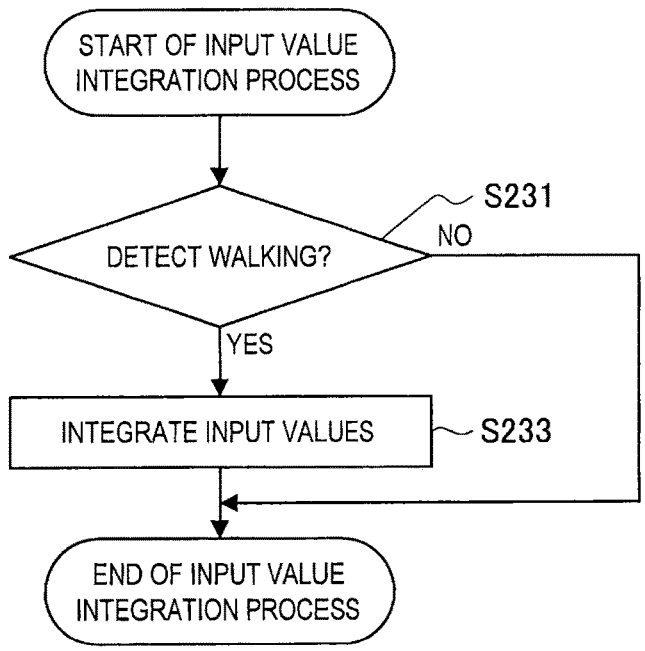
FIG. 12 is a flow chart showing an example of the operation of an input value integrating process of the mobile terminal according to the embodiment.
Figure 13:
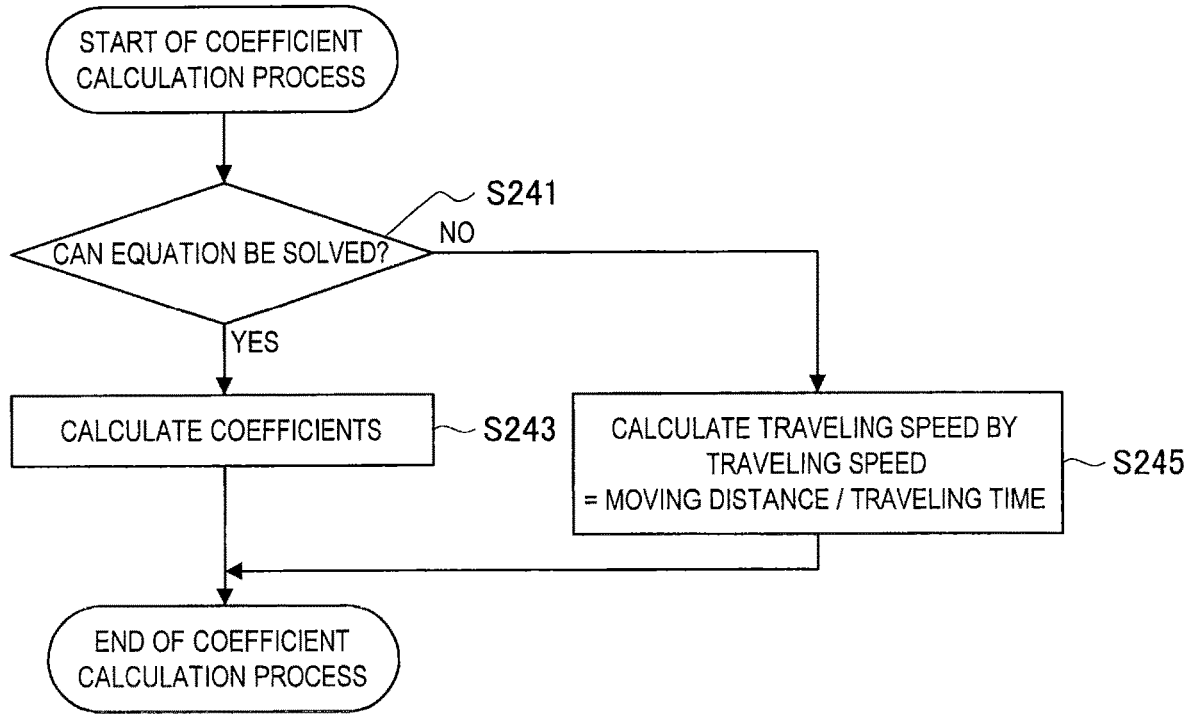
FIG. 13 is a flow chart showing an example of the operation of a coefficient calculation process of the mobile terminal according to the embodiment.

Next, the operation of the mobile terminal according to the second embodiment of the present disclosure will be described with reference to FIGS. 11 to 13. FIG. 11 is a flow chart showing an example of the operation of the mobile terminal according to the embodiment. FIG. 12 is a flow chart showing an example of the operation of an input value integrating process of the mobile terminal according to the embodiment. FIG. 13 is a flow chart showing an example of the operation of a coefficient calculation process of the mobile terminal according to the embodiment.

First, the mobile terminal 200 determines whether GPS positioning is possible (S201). If the GPS positioning is determined to be possible, the absolute positioning section 101 of the mobile terminal 200 acquires the current position information (S203). Then, the counting section 105 acquires the current time information (S205). Then, the counting section 105 counts the elapsed time from this point and also starts a steps count process (S207). The walking tempo calculation section 107 calculates the walking tempo by using the elapsed time and the number of steps counted by the counting section 105 (S209).

The function identification section 210 integrates input values (S211). Regarding the input value integration process in step S211, FIG. 12 is referred to. First, the function identification section 210 determines whether the walking determination section 103 detects that the user is walking (S231). Then, the function identification section 210 integrates input values only when walking is detected in the determination in step S241 (S233). The input value used here is the walking tempo.

To continue with the description by returning to FIG. 11 again, next the function identification section 210 performs a walking tempo classification process (S213). Then, the function identification section 210 determines whether a fixed time has passed (S215). If it is determined that the fixed time has passed, next the function identification section 210 increments an interval count by 1 (S217). Next, the function identification section 210 determines whether the interval count is equal to 2 or larger (S219).

If it is determined in step S219 that the interval count is equal to 2 or larger, the function identification section 219 identifies a function by performing a coefficient calculation process (S221). Details of the coefficient calculation process in step S221 are shown in FIG. 13. Referring to FIG. 13, first the function identification section 210 determines whether the equation can be solved (S241). In the above example of using a linear correlation, for example, the determination may be made based on whether a difference of integrated values of the walking tempo f in two intervals is equal to or larger than a predetermined value. Then, if the determination is made in step S231 that the equation can be solved, the function identification section 210 calculates coefficients by solving the equation (S243). On the other hand, if the determination is made in step S231 that the equation cannot be solved, the function identification section 210 calculates the traveling speed by dividing the moving distance by the traveling time (S245).

To continue with the description by returning to FIG. 11 again, next the step calculation section 211 calculates the traveling speed in each time interval (S223). Next, the step calculation section 211 calculates the step using the traveling speed (S225). Next, the learning section 113 learns the correspondence between the step in each time interval in which the traveling speed is calculated and the walking tempo in the time interval (S227). Next, the learning section 113 determines whether to end learning (S229). If it is determined in step S229 that learning should end, the present flow is terminated. On the other hand, if it is determined in step S229 that learning should not end, the process continues by returning to step S201. If, in step S201, GPS positioning is determined to be impossible, the autonomous positioning section 117 of the mobile terminal 200 can perform autonomous positioning (S210). The autonomous positioning performed in step S210 is similar to the above process described with reference to FIG. 6.

3-3. Walking Tempo Classification

Figure 14:
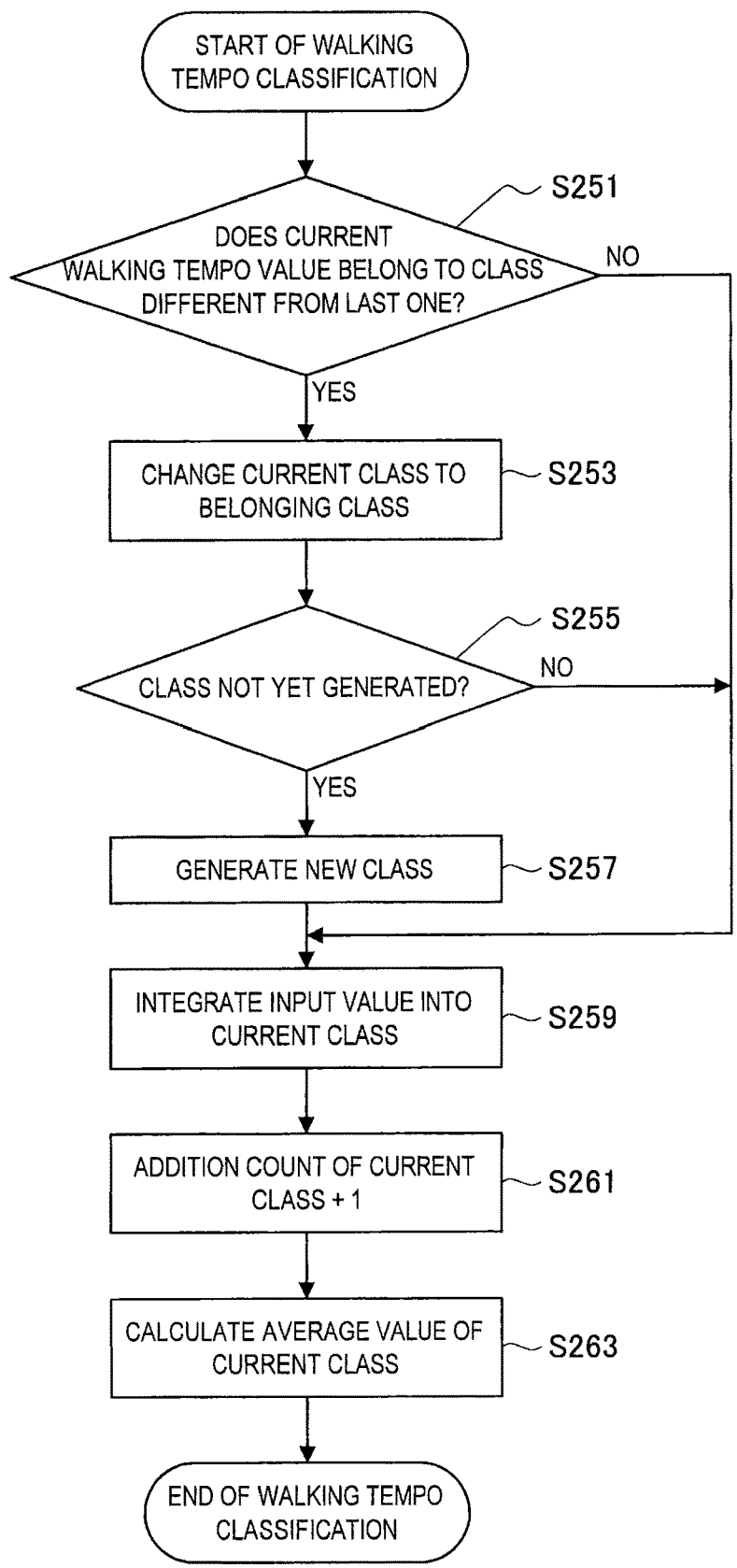
FIG. 14 is a flow chart showing an example of the operation of a walking tempo classification process of the mobile terminal according to the embodiment.
Figure 15:
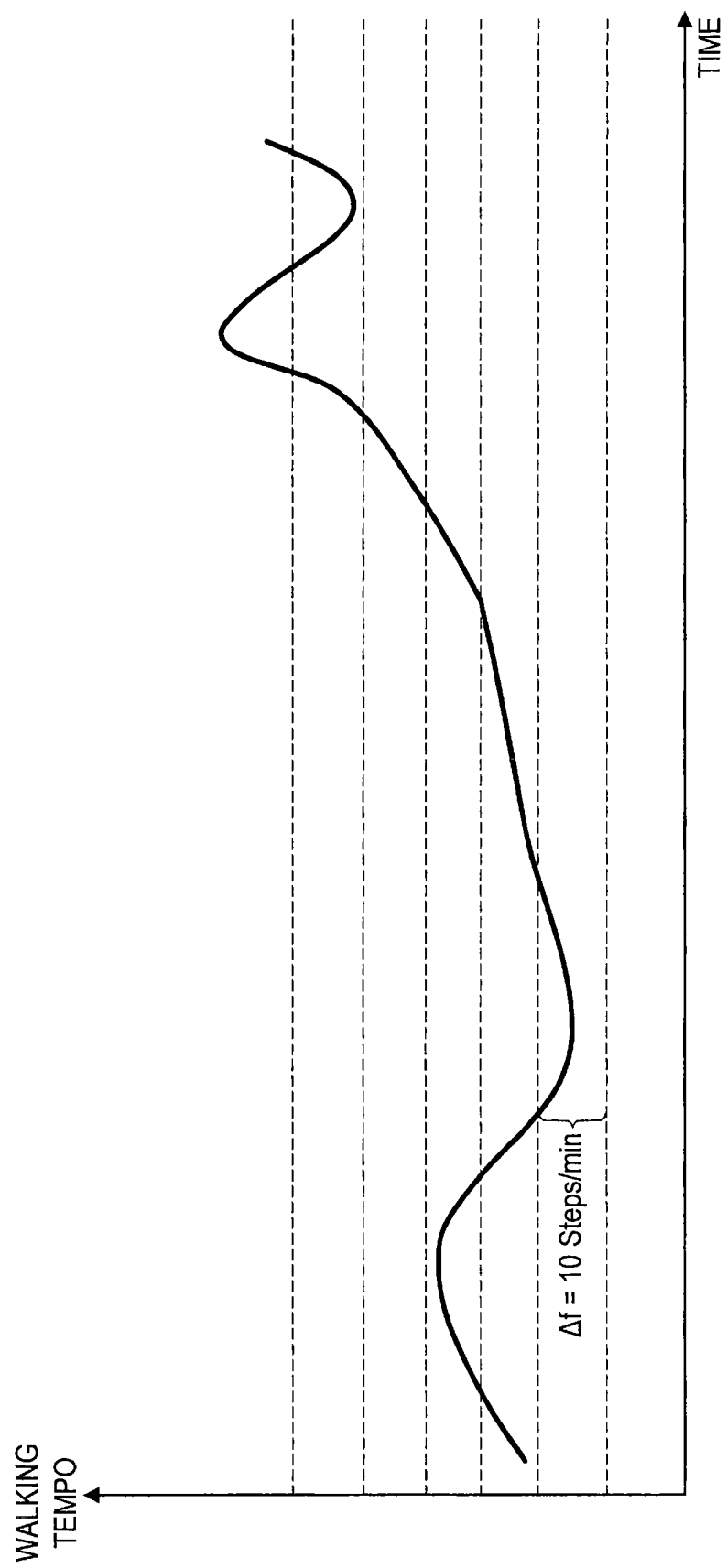
FIG. 15 is an explanatory view illustrating the walking tempo classification process of the mobile terminal according to the embodiment.
Figure 16:
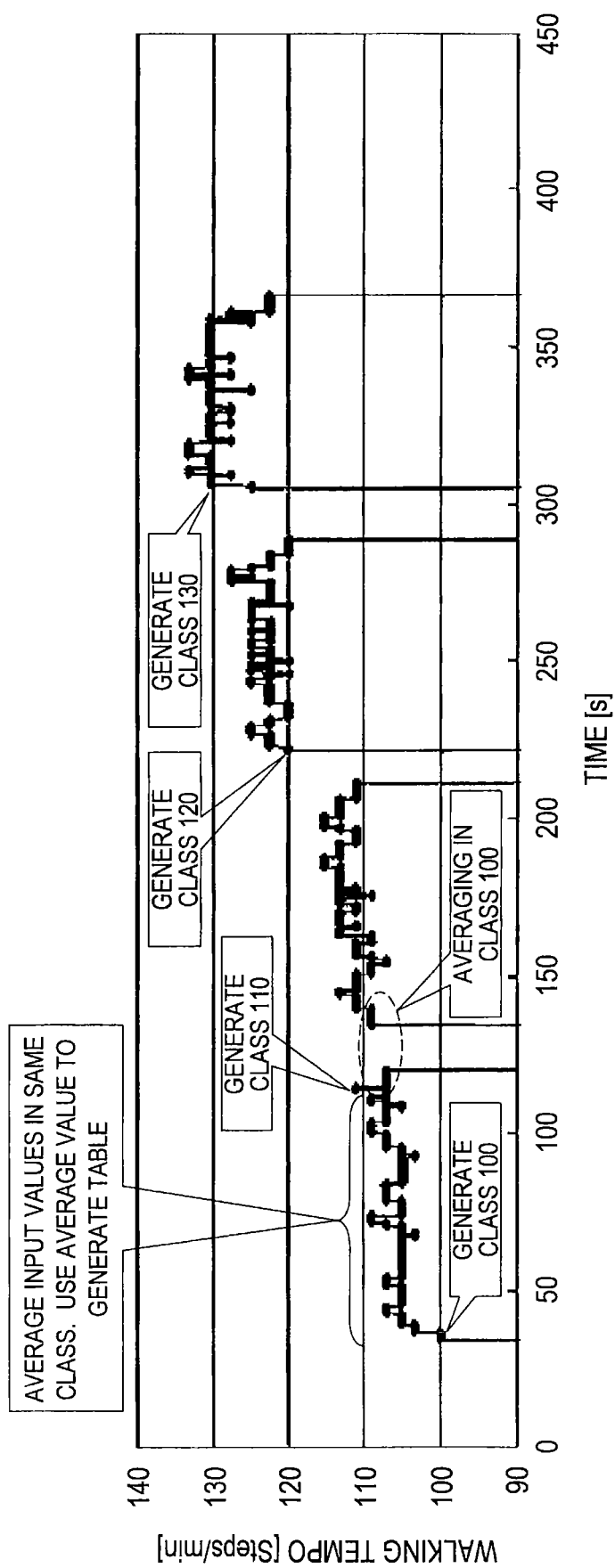
FIG. 16 is an explanatory view using a concrete example to illustrate the walking tempo classification process of the mobile terminal according to the embodiment.

The classification of the walking tempo shown in step S213 in FIG. 11 will be described with reference to FIGS. 14 to 16. FIG. 14 is a flow chart showing an example of the operation of the walking tempo classification process of the mobile terminal according to the embodiment. FIG. 15 is an explanatory view illustrating the walking tempo classification process of the mobile terminal according to the embodiment. FIG. 16 is an explanatory view using a concrete example to illustrate the walking tempo classification process of the mobile terminal according to the embodiment.

First, referring to FIG. 14, the function identification section 210 first determines whether the current walking tempo value belongs to a different class from the last class (S251). Here, preset conditions are used as conditions for classification. For example, as shown in FIG. 15, the walking tempo is classified by equal interval Δf=10 Steps/min and the walking tempo in the same class can be considered to be the same. If the walking tempo is handled as continuous quantities, the amount of information of a table will be huge. Thus, the walking tempo is classified and the average tempo value is determined for each class. By classifying the walking tempo in this manner, the amount of information can be reduced.

To continue with the description by returning to FIG. 14 again, when it is determined in step S251 that a walking tempo value that is different from the last one is obtained, the function identification section 210 changes the current class to the class to which the current walking tempo value belongs (S253). Then, the function identification section 210 determines whether the current class is a class that has not yet been generated (S255). If it is determined in step S255 that the current class is a class that has not yet been generated, the function identification section 210 generates a new class (S257).

Then, the function identification section 210 integrates the input value into the current class (S259). On the other hand, if it is determined in step S251 that the current walking tempo value belongs to the same class as the last one, next the process of step S259 is performed. Also if it is determined in step S255 that the current class is a class that has been generated, the process in step S257 is omitted and the process of step S259 is performed. Then, the function identification section 210 increments an addition count of the current class by 1 (S261). Then, the function identification section 210 calculates the average walking tempo value of the current class (S263).

For example, referring to a concrete example in FIG. 16, the function identification section 210 generates a class 100 when the current walking tempo value exceeds 100 Steps/min. Then, while the walking tempo value changes between 100 and 110 Steps/min, a green space weaving through the current class 100 can be integrated. Then, when the walking tempo value exceeds 110, a new class 110 is generated. In FIG. 16, the walking tempo value falls below 110 again. Thus, the function identification section 210 returns to the current class to the class 100 to restart an averaging process of the class 100.

3-4. Effect Example

As described above, the mobile terminal 200 according to the second embodiment of the present disclosure assumes that there is a correlation between the traveling speed and the walking tempo and assumes a function that holds between the traveling speed and the walking tempo. Then, the function is identified by calculating coefficients contained in the function from values that can be acquired by using a sensor or the like. Then, the mobile terminal 200 can calculate the step corresponding to the respective walking tempo value by using the function. In the method of using the time averages of the step and walking tempo in an interval of learning, one correspondence in the interval is calculated. Thus, in circumstances in which the walking tempo changes in various ways in an interval, an error of the calculated step increases and also the range of the walking tempo in a correspondence table becomes narrower than the range of the actual walking tempo. According to the configuration of the mobile terminal 200, by contrast, even i the walking tempo changes in a learning interval, the highly precise traveling speed (or the step) corresponding to each walking tempo can be calculated. Therefore, the precision of step is improved and also the range of the walking tempo in a correspondence table can be brought closer to the range of the actual walking tempo.

In this case, the walking tempo can be classified and input values can be integrated for each class. As described above, the mobile terminal 200 can calculate the traveling speed (or the step) for each walking tempo. Thus, if the walking tempo is handled as continuous quantities, the amount of information of a correspondence table will be huge. Thus, the walking tempo may be classified to calculate the traveling speed (or the step) corresponding to the average value of the walking tempo value in a class having a certain margin. By adopting such a configuration, the amount of information of a correspondence table can be reduced.

4. Third Embodiment 4-1. Function Configuration

Figure 17:
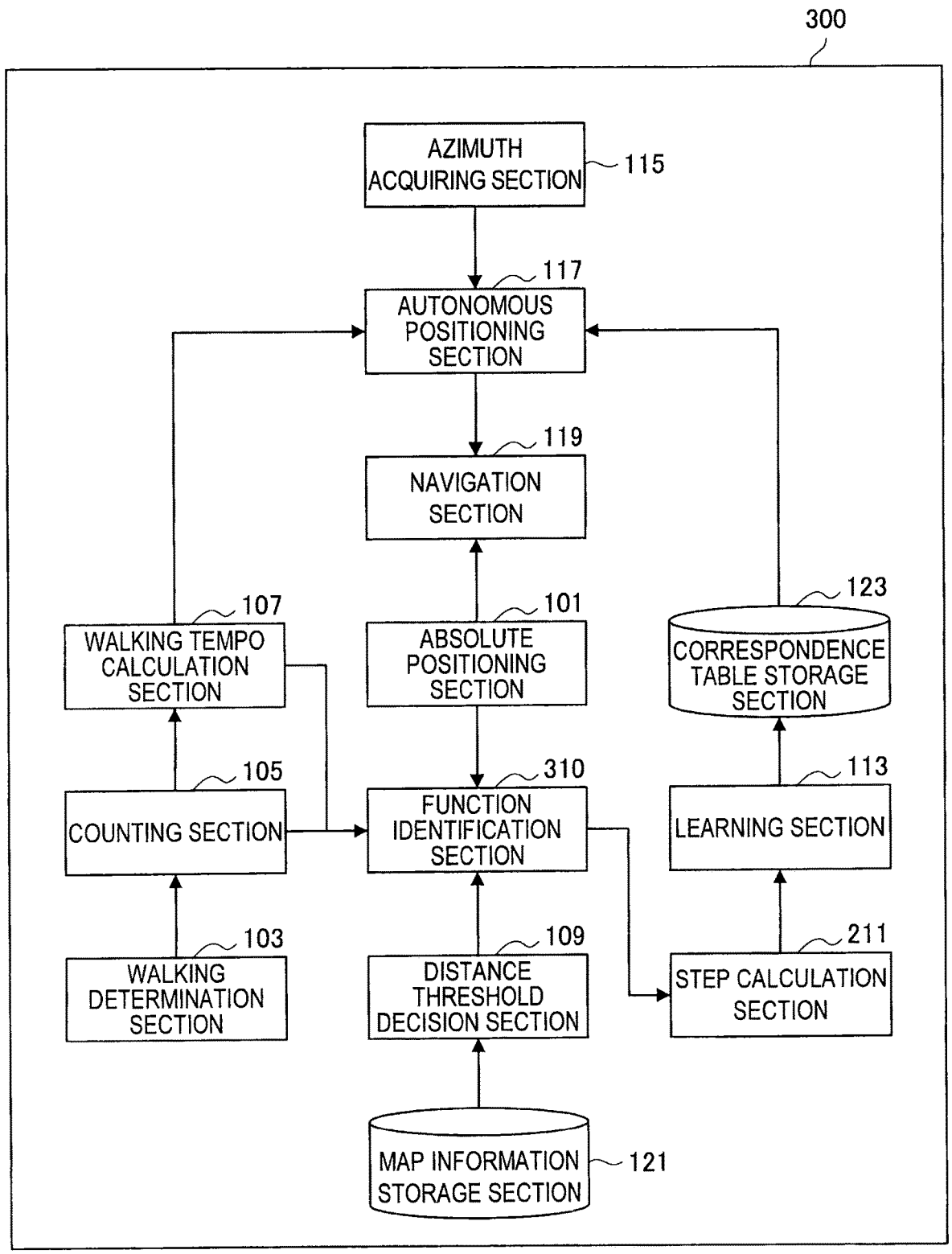
FIG. 17 is a block diagram showing the function configuration of a mobile terminal according to a third embodiment of the present disclosure.
Figure 18:
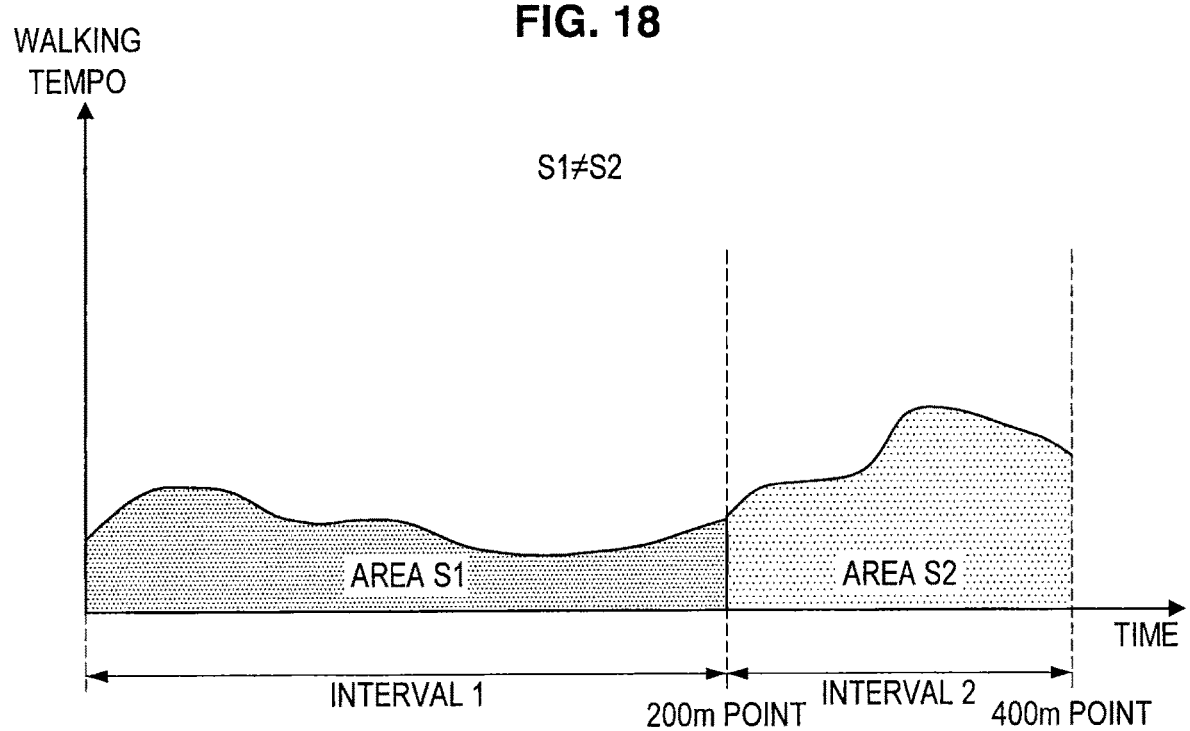
FIG. 18 is an explanatory view illustrating a case when the function can be identified in the creation of a correspondence table of the mobile terminal according to the embodiment.
Figure 19:
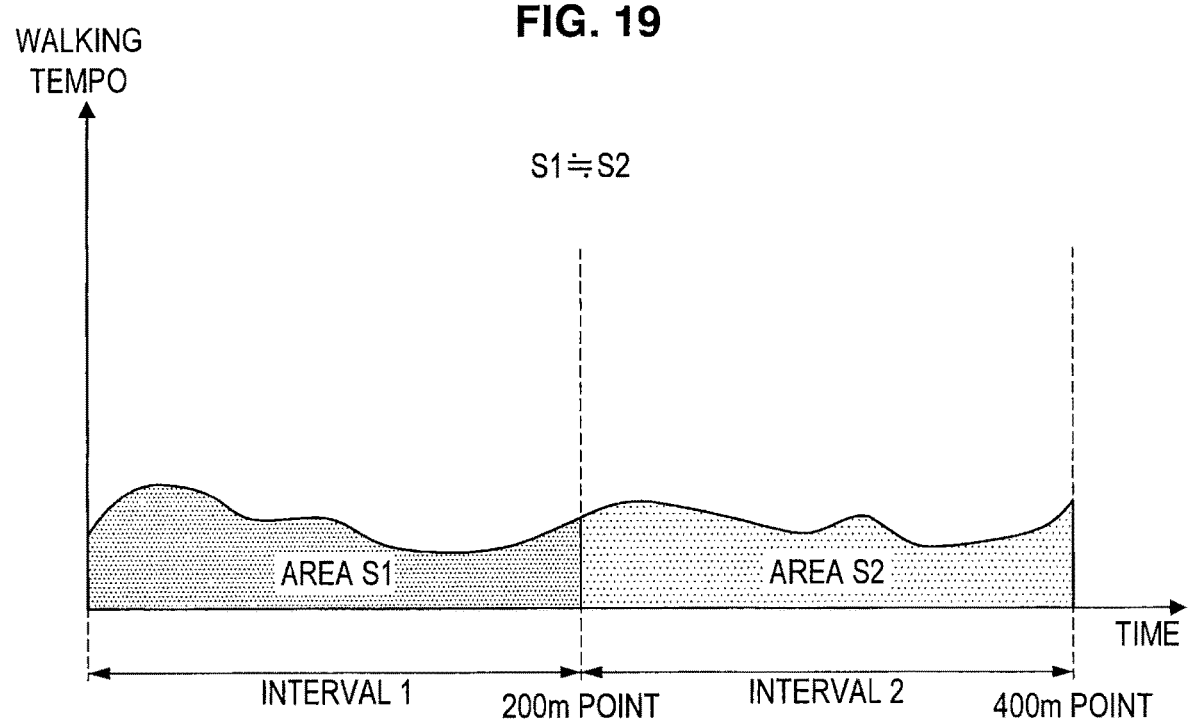
FIG. 19 is an explanatory view illustrating a case when the function cannot be identified in the creation of a correspondence table of the mobile terminal according to the embodiment.

Next, the configuration of a mobile terminal according to the third embodiment of the present disclosure will be described with reference to FIGS. 17 to 19. FIG. 17 is a block diagram showing the function configuration of a mobile terminal according to the third embodiment of the present disclosure. FIG. 18 is an explanatory view illustrating a case when the function can be identified in the creation of a correspondence table of the mobile terminal according to the embodiment. FIG. 19 is an explanatory view illustrating a case when the function cannot be identified in the creation of a correspondence table of the mobile terminal according to the embodiment.

A mobile terminal 300 is an information processing apparatus having an autonomous navigation function while walking. The mobile terminal 300 may be, for example, an information processing apparatus such as a mobile phone, PDA (Personal Digital Assistants), smartphone, mobile music reproducing apparatus, mobile video processing apparatus, mobile game machine, mobile PC (Personal Computer) (including a notebook PC and a tablet PC), and navigation apparatus including PND (Personal Navigation Device). In the description of the present embodiment below, a user carrying the mobile terminal 300 is simply called a user.

The mobile terminal 300 is an information processing apparatus combining the configuration that sets a predetermined distance as a trigger to calculate the step described in the first embodiment and the configuration that calculates the traveling speed (or the step) corresponding to each walking tempo by assuming a function that holds between the walking tempo and the traveling speed.

The mobile terminal 300 mainly includes the absolute positioning section 101, the walking determination section 103, the counting section 105, the walking tempo calculation section 107, the distance threshold decision section 109, a function identification section 310, the step calculation section 211, the learning section 113, the azimuth acquiring section 115, the autonomous positioning section 117, the navigation section 119, the map information storage section 121, and the correspondence table storage section 123.

The configuration of the mobile terminal 300 according to the present embodiment partially overlaps with the configuration of the mobile terminal 100 according to the first embodiment of the present disclosure and partially overlaps with the configuration of the mobile terminal 200 according to the second embodiment of the present disclosure. Thus, the same reference signs are attached to elements similar to those of the mobile terminal 100 or the mobile terminal 200 to omit the description thereof here and differences will mainly be described.

(Function Identification Section 310)

The function identification section 310 has a function of identifying a function assumed to hold between the walking tempo and the traveling speed. The function identification section 310 can identify a function by substituting values acquired by setting a predetermined distance decided by the distance threshold decision section 109 as an interval to calculate coefficients contained in the function.

It is assumed here like in the second embodiment that the relationship of Math (2) holds between the walking tempo f and the traveling speed v.

$$v = a \times \hat{f} + b \ldots 数式 \quad (2)$$

Math (2)

a and b are learning coefficients.

From the above Math (2), the relationship of Math (3) shown below can be said to hold among the moving distance X, the walking tempo f, and the traveling time T.

Math (3)

$$\hat{X} = \sum^{t} v \quad (3)$$
$$= \sum^{t} \left( a \times \hat{f} + b \right)$$
$$= a \times \sum^{t} \hat{f} + b \times \hat{T} \ldots 数式$$

The moving distance X is acquired based on position information acquired by the absolute positioning section 101. The walking tempo f is calculated by the walking tempo calculation section 107. The traveling time T is counted by the counting section 105. Therefore, the coefficient a and the coefficient b can be calculated by acquiring the values of the moving distance X, the walking tempo f, and the traveling time T of two intervals. The function identification section 310 can classify the walking tempo f and integrate the walking tempo for each class. The classification of the walking tempo f is as described in detail in the second embodiment of the present disclosure with reference to FIGS. 14 to 16.

The function identification section 310 can identify the assumed function by acquiring the moving distance X and the traveling time T after the predetermined distance decided by the distance threshold decision section 109 being set as an interval as described above and further solving an equation using the integrated walking tempo f to calculate the coefficient a and the coefficient b. However, there are sometimes cases when the coefficient a and the coefficient b cannot be calculated.

For example, if, as shown in FIG. 18, the average tempo is different from interval to interval (integrated values of the walking tempo are different: S1≠S2), the function identification section 310 can solve an equation and identify the function. However, if, as shown in FIG. 19, the average tempo in each interval is approximately the same (integrated values of the walking tempo are approximately the same: S1≠S2), the function identification section 310 cannot solve an equation and identify the function.

Thus, if an equation can be solved, the function identification section 310 supplies the identified function to the step calculation section 211. If an equation cannot be solved, the function identification section 310 can supply information indicating that the function cannot be identified to the step calculation section 211.

4-2. Operation Example

Figure 20:
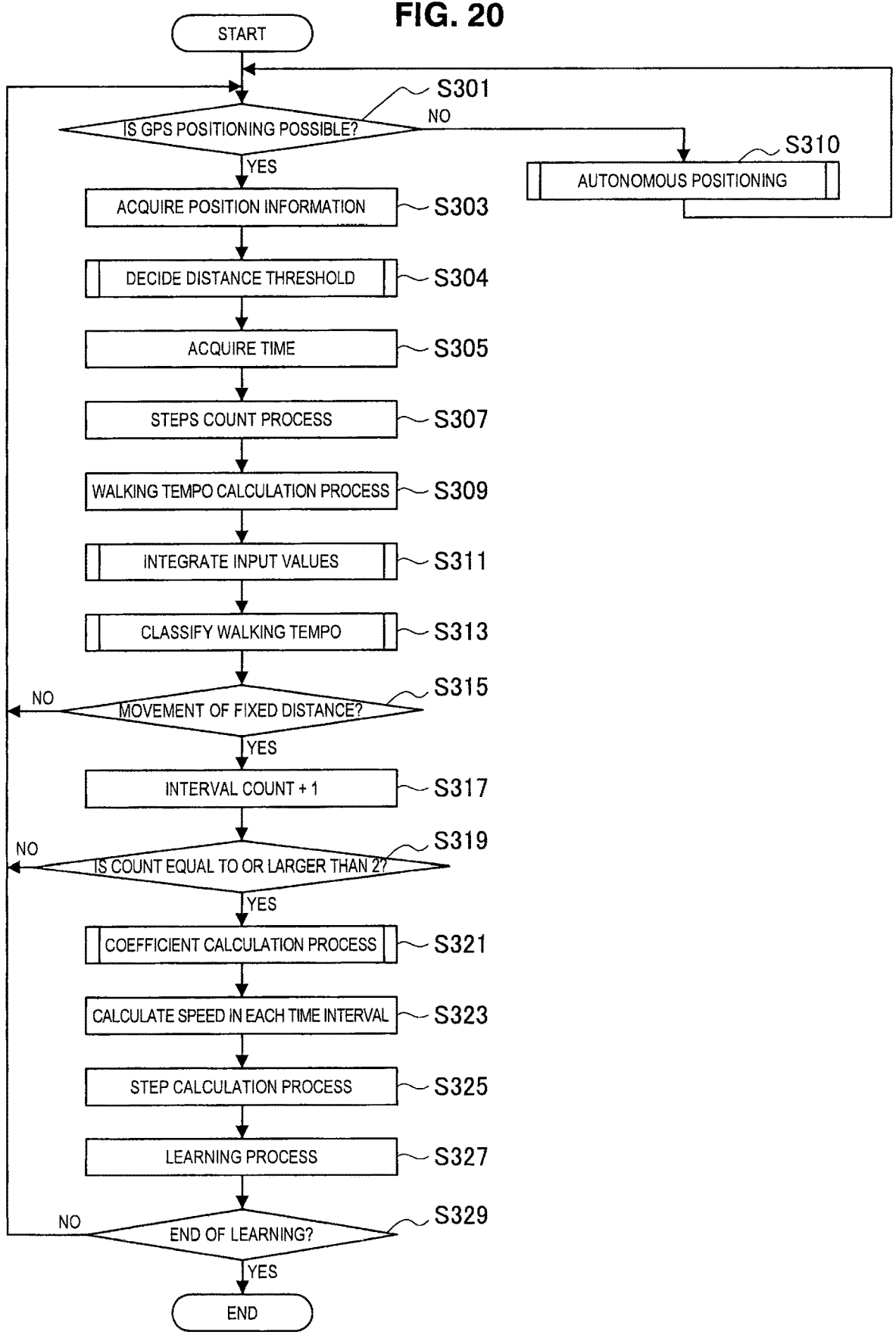
FIG. 20 is a flow chart showing an example of the operation of the mobile terminal according to the embodiment.

Next, the operation of the mobile terminal according to the third embodiment of the present disclosure will be described with reference to FIG. 20. FIG. 20 is a flow chart showing an example of the operation of the mobile terminal according to the embodiment.

First, the mobile terminal 300 determines whether GPS positioning is possible (S301). If the GPS positioning is determined to be possible, the absolute positioning section 101 of the mobile terminal 300 acquires the current position information (S303). Then, the distance threshold decision section 109 decides the distance threshold (S304). The distance threshold decision process shown in step S304 may be the distance threshold decision process described with reference to FIG. 4 or 5.

Then, the counting section 105 acquires the current time information (S305). Then, the counting section 105 counts the elapsed time from this point and also starts a steps count process (S307). The walking tempo calculation section 107 calculates the walking tempo by using the elapsed time and the number of steps counted by the counting section 105 (S309).

Then, the function identification section 310 integrates input values (S311). The input value integration process shown in step S311 may be the input value integration process described above using FIG. 12. Next, the function identification section 310 performs a walking tempo classification process (S313). The walking tempo classification process may be the walking tempo classification process described above using FIG. 14.

Then, the function identification section 310 determines whether the predetermined distance decided in step S304 is moved (S315). If it is determined that the predetermined distance is moved, next the function identification section 310 increments the interval count by 1 (S317). Next, the function identification section 310 determines whether the interval count is equal to 2 or larger (S319).

If it is determined in step S319 that the interval count is equal to 2 or larger, the function identification section 319 identifies a function by performing a coefficient calculation process (S321). The coefficient calculation process shown in step S321 may be the coefficient calculation process described above using FIG. 13.

Next, the step calculation section 211 calculates the traveling speed in each time interval (S323). Next, the step calculation section 211 calculates the step using the traveling speed (S325). Next, the learning section 113 learns the correspondence between the step in each time interval in which the traveling speed is calculated and the walking tempo in the time interval (S327). Next, the learning section 113 determines whether to end learning (S329). If it is determined in step S329 that learning should end, the present flow is terminated. On the other hand, if it is determined in step S329 that learning should not end, the process continues by returning to step S301. If, in step S301, GPS positioning is determined to be impossible, the autonomous positioning section 117 of the mobile terminal 300 can perform autonomous positioning (S310). The autonomous positioning performed in step S310 may be the above autonomous positioning process described above with reference to FIG. 6.

4-3. Experimental Results

Figure 21:
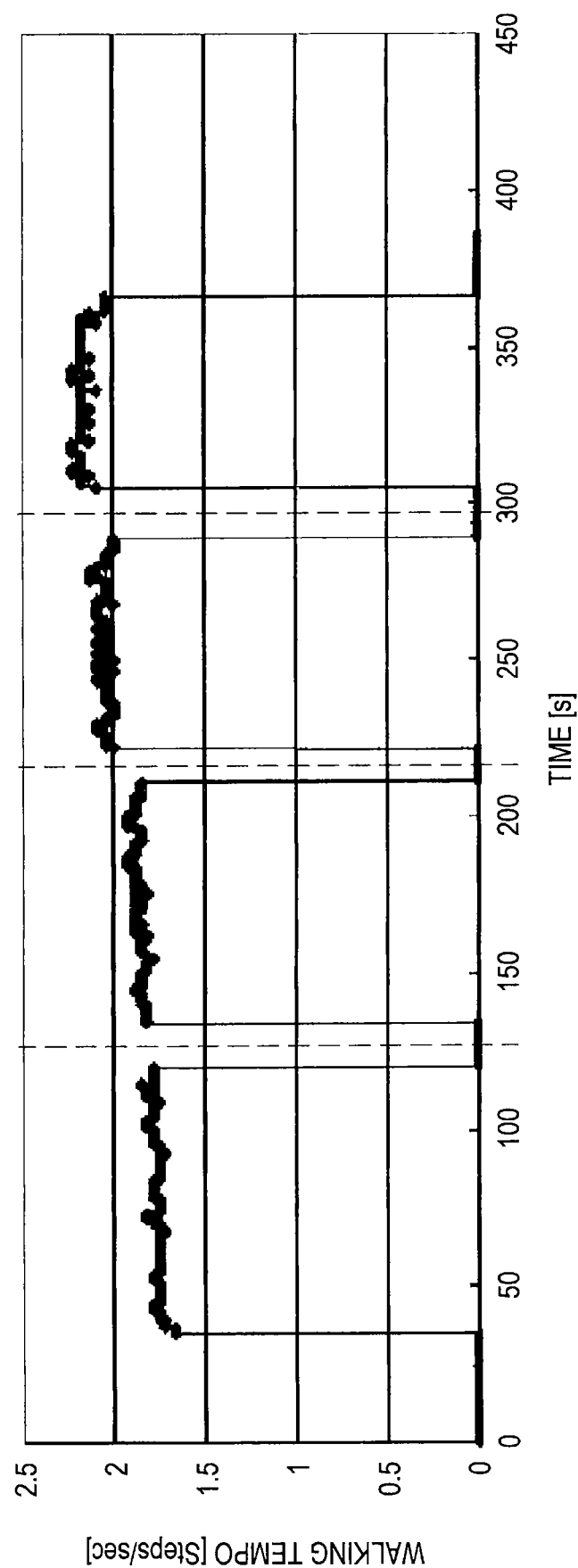
FIG. 21 is a graph showing an example of experimental results showing changes of a walking tempo in the mobile terminal according to the embodiment.
Figure 22:
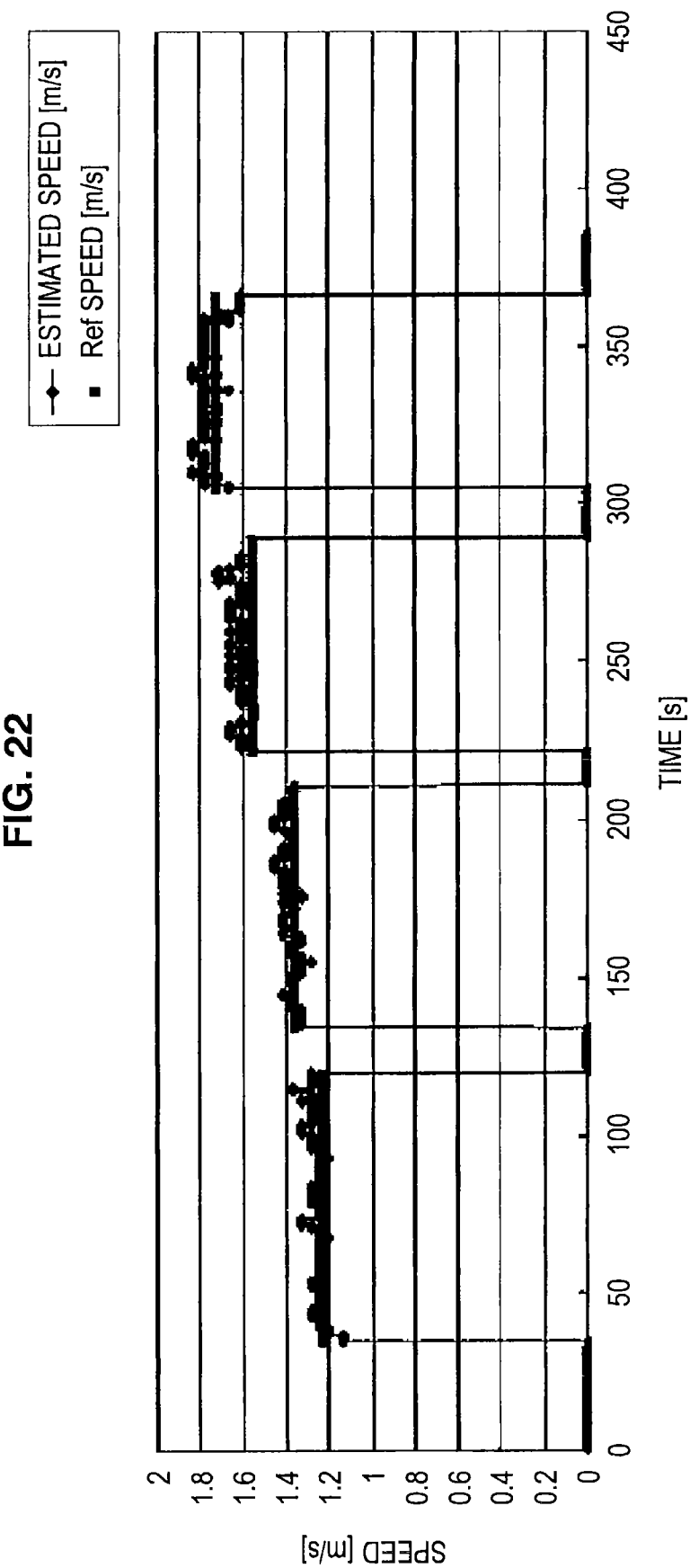
FIG. 22 is a graph showing an example of experimental results comparing the speed estimated for the mobile terminal according to the embodiment and the actual speed.
Figure 23:
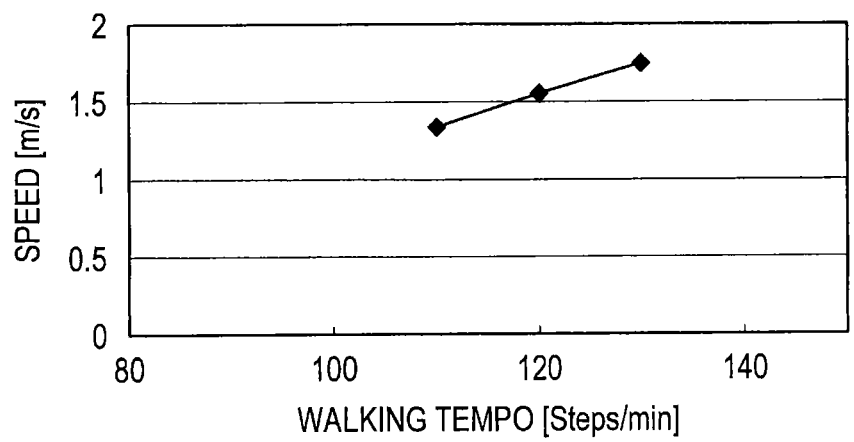
FIG. 23 is an explanatory view showing an example of the correspondence table between the walking tempo and the speed created in the mobile terminal according to the embodiment.
Figure 24:
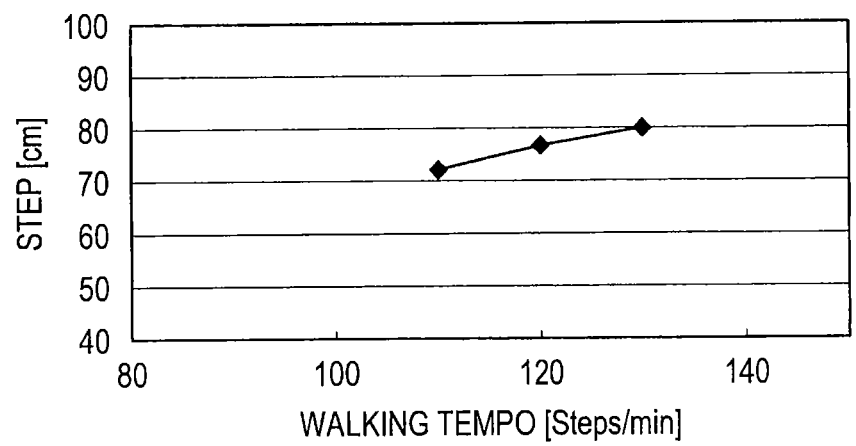
FIG. 24 is an explanatory view showing an example of the correspondence table between the walking tempo and a step created in the mobile terminal according to the embodiment.

Next, experimental results verifying the validity of creating a correspondence table by the mobile terminal 300 according to the present embodiment will be described with reference to FIGS. 21 to 24. FIG. 21 is a graph showing an example of experimental results showing changes of the walking tempo in the mobile terminal according to the embodiment. FIG. 22 is a graph showing an example of experimental results comparing the speed estimated for the mobile terminal according to the embodiment and the actual speed. FIG. 23 is an explanatory view showing an example of the correspondence table between the walking tempo and the speed created in the mobile terminal according to the embodiment. FIG. 24 is an explanatory view showing an example of the correspondence table between the walking tempo and the step created in the mobile terminal according to the embodiment.

Here, the step learning is done by actually changing the speed to verify the validity of the theory described in the present embodiment. FIG. 21 shows the elapsed time and changes of the measured walking tempo. The traveling speed is changed at points in time of a broken line. Here, the speed is gradually increased from interval to interval.

When peak values of the walking tempo measured as shown in FIG. 21 are integrated and the known moving distance (400 m) is used, the coefficient a=1.25 and the coefficient b=−0.96 are calculated. The speed in each interval is calculated based on these coefficients, which is shown in FIG. 22. FIG. 22 shows the estimated speed calculated from the identified function and the actual speed. Thus, the fact that a highly precise traveling speed can be obtained is verified.

Correspondence tables actually created in the examples shown in FIGS. 21 and 22 are shown in FIGS. 23 and 24. The vertical axis of FIG. 23 is the speed and the vertical axis of FIG. 24 is the step. The speed and the step can mutually be calculated by using the above Math (1) v=k×f.

4-4. About Input Value

Figure 25:
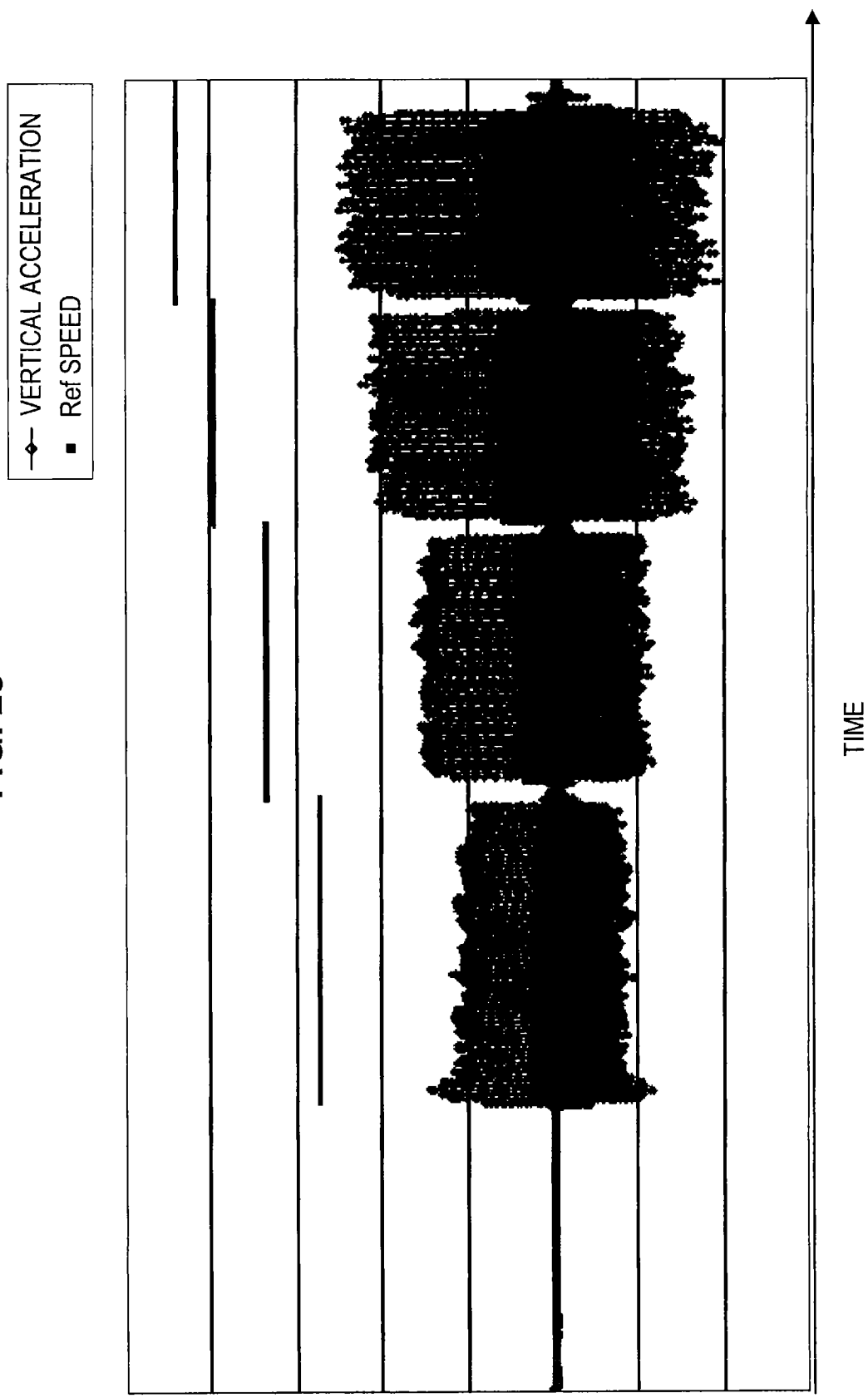
FIG. 25 is a graph showing that there is a correlation between vertical acceleration measured by the mobile terminal according to the embodiment and the actual speed.
Figure 26:
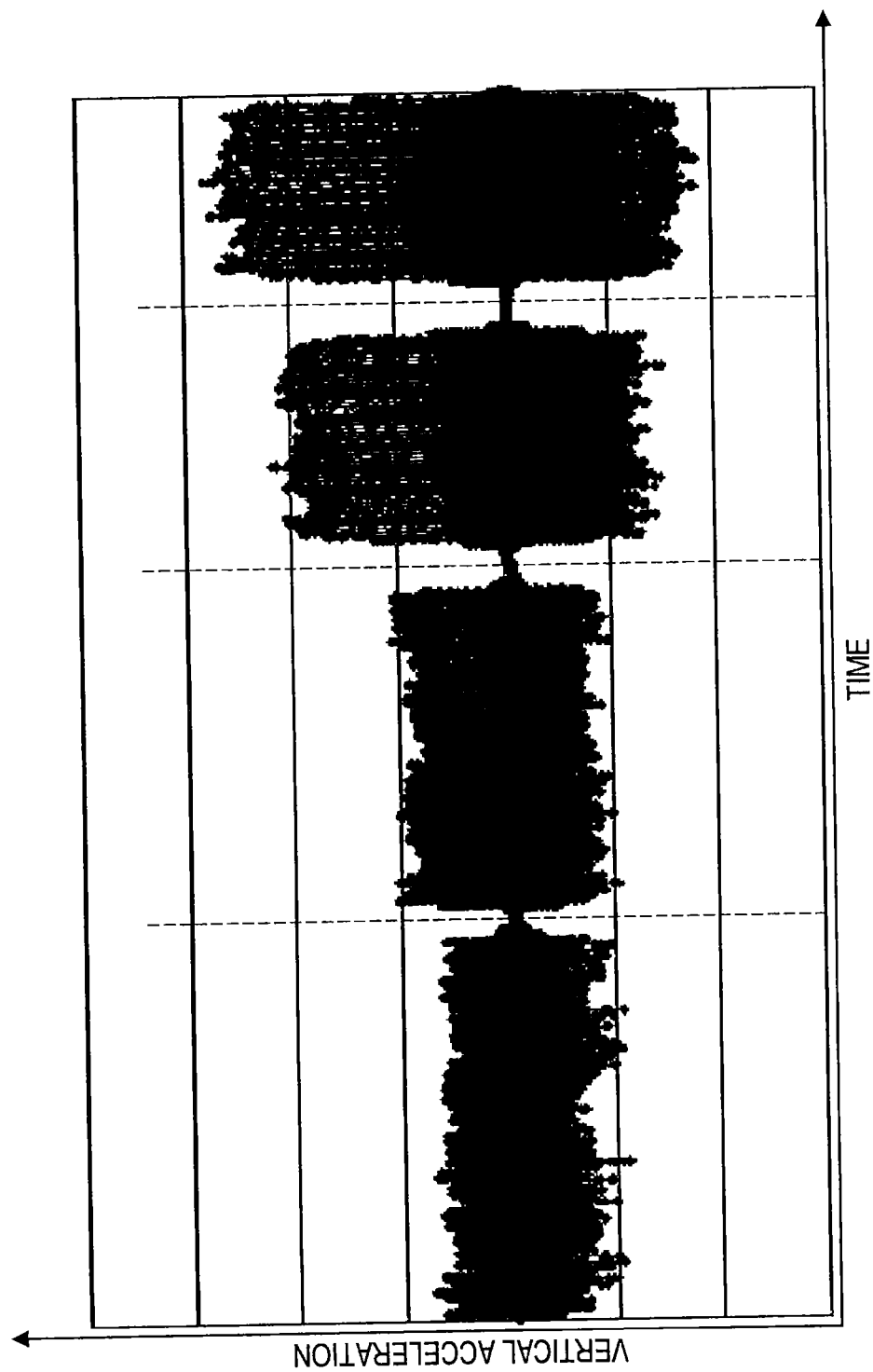
FIG. 26 is a graph showing experimental results of the vertical acceleration measured by putting the mobile terminal according to the embodiment into a trouser front pocket.
Figure 27:
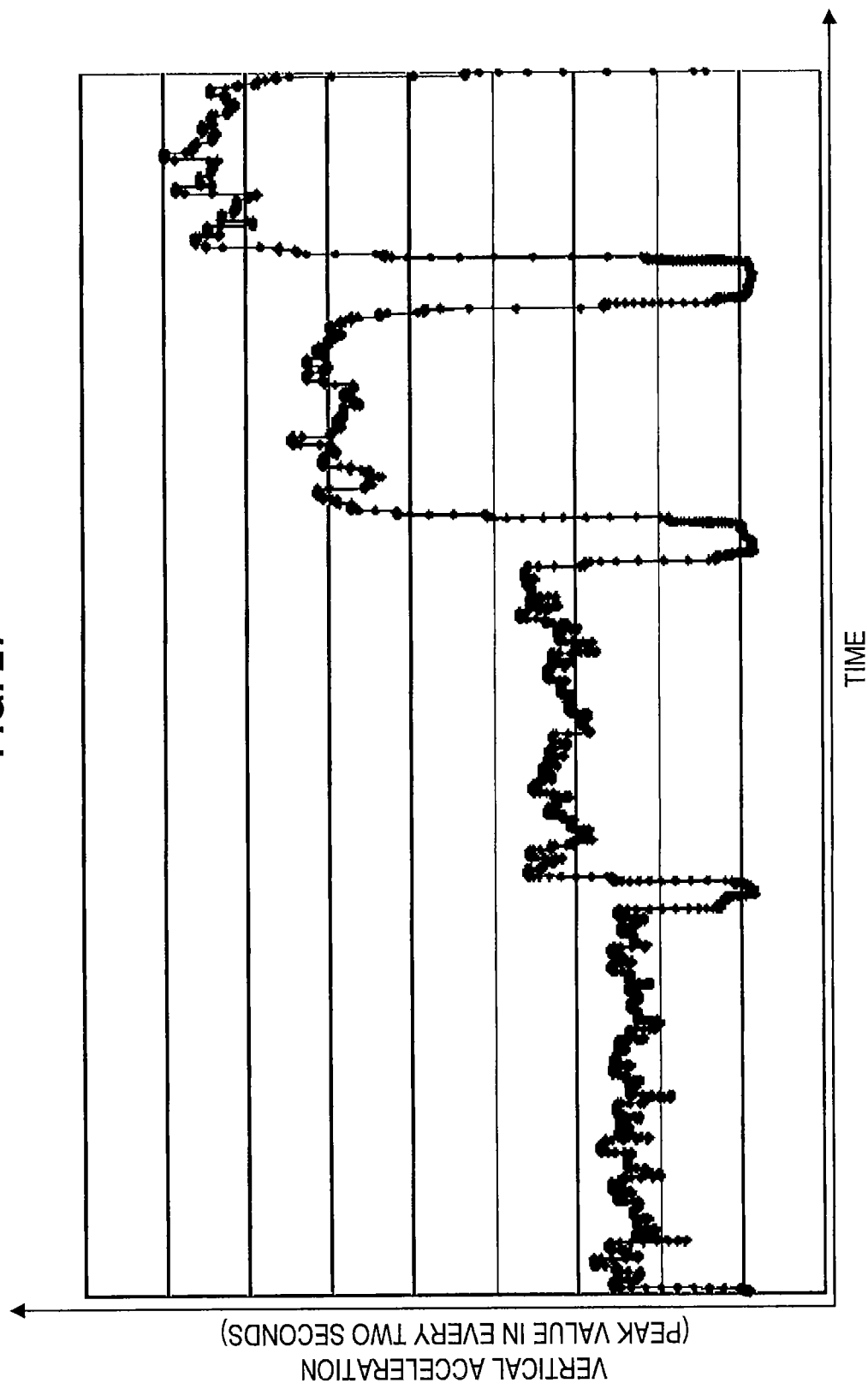
FIG. 27 is a graph obtained by extracting peak values in every two seconds from the experimental results in FIG. 26.
Figure 28:
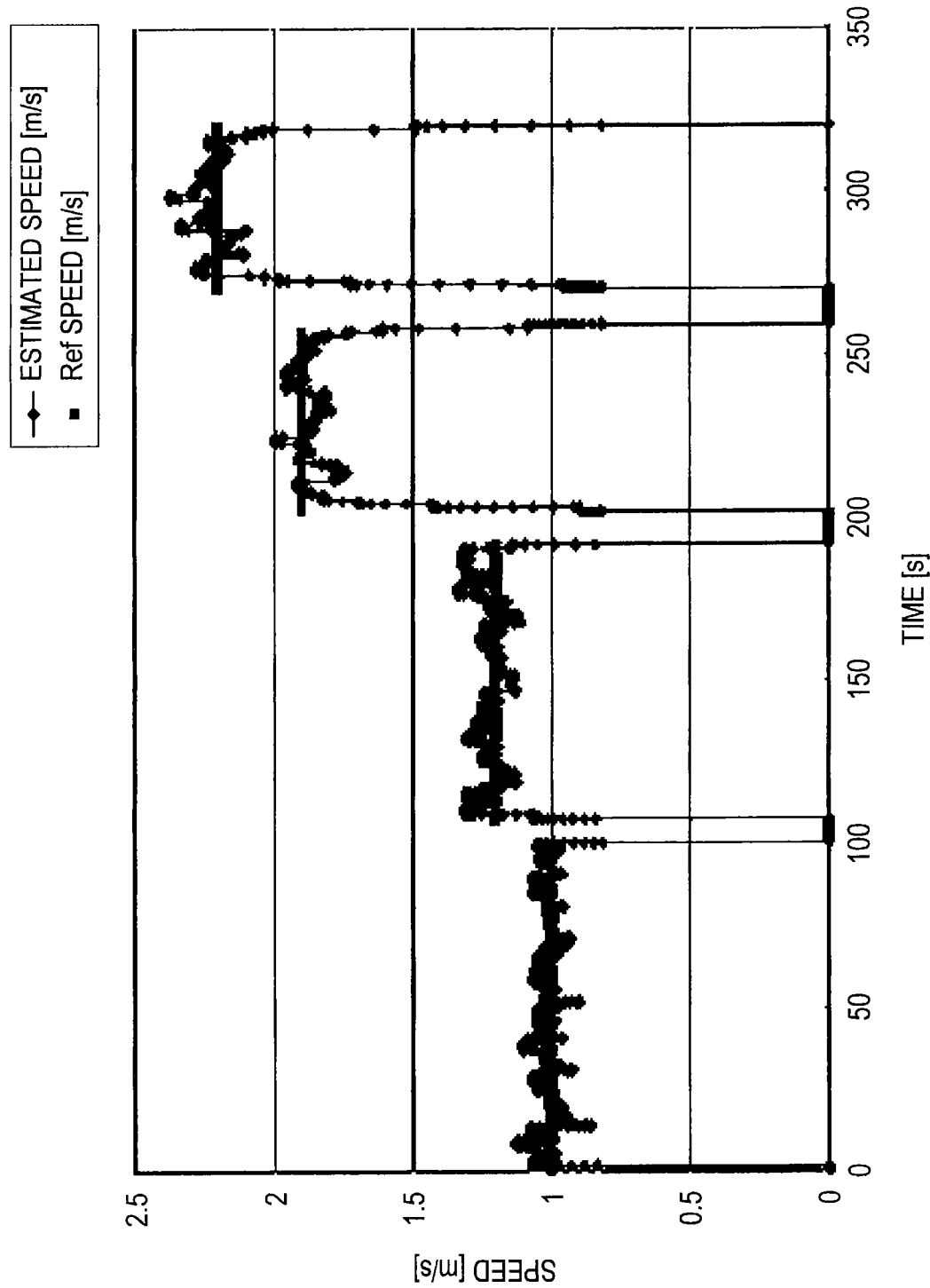
FIG. 28 is a graph showing experimental results comparing the estimated speed calculated by using a function identified for the mobile terminal according to the embodiment and the actual speed in each interval.
Figure 29:
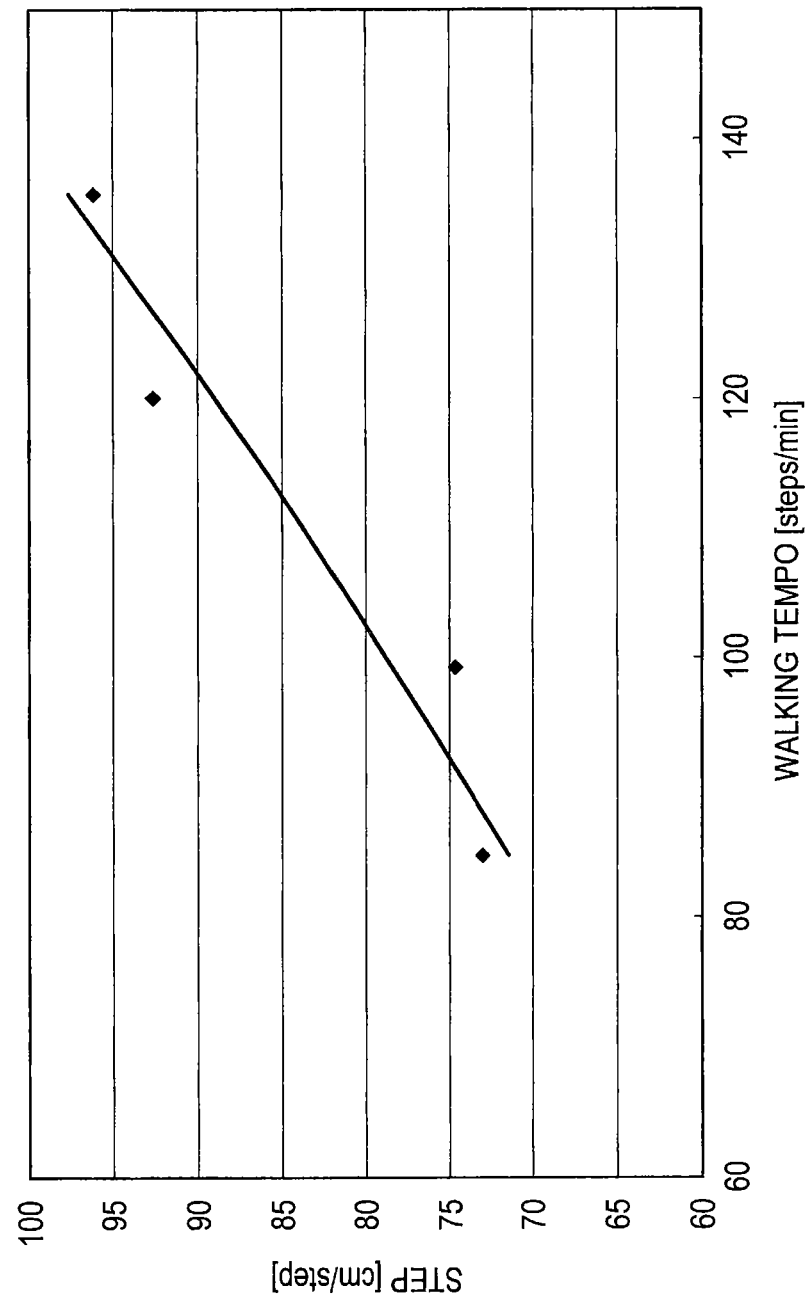
FIG. 29 is an explanatory view showing an example of the correspondence table generated by using the function identified for the mobile terminal according to the embodiment.

In the above embodiment, the walking tempo f is used as the input value. However, the input value is not limited to the walking tempo if an input value is strongly correlated with the speed and the correlation is low-order if possible. Other examples of the input value will be described with reference to FIGS. 25 to 29. FIG. 25 is a graph showing that there is a correlation between vertical acceleration measured by the mobile terminal according to the embodiment and the actual speed. FIG. 26 is a graph showing experimental results of the vertical acceleration measured by putting the mobile terminal according to the embodiment into a trouser front pocket. FIG. 27 is a graph obtained by extracting peak values in every two seconds from the experimental results in FIG. 26. FIG. 28 is a graph showing experimental results comparing the estimated speed calculated by using a function identified for the mobile terminal according to the embodiment and the actual speed in each interval. FIG. 29 is an explanatory view showing an example of the correspondence table generated by using the function identified for the mobile terminal according to the embodiment.

For example, the vertical acceleration can be cited as a value that can be acquired by mobile terminals that are widely used such as smartphones and as a quantity satisfying the above conditions.

It is clear that there is a definite correlation between the vertical acceleration and the speed by referring to, for example, FIG. 25. Thus, a function that holds between the vertical acceleration and the speed is assumed and the function can be identified by calculating coefficients. In addition, the speed is calculated from these coefficients and a correspondence table is generated by associating the walking tempo measured simultaneously with the acceleration and the speed.

For example, FIG. 26 shows changes of the vertical acceleration measured by the mobile terminal 300 put into a trouser front pocket. In FIG. 26, a vertical broken line indicates a time when the speed changes. FIG. 27 shows peak values in every two seconds extracted from data shown in FIG. 26. The coefficient a=1.2 and the coefficient b=0.68 are calculated as a result of integrating peak values extracted here and using the known distance threshold 400 m. FIG. 28 shows the speed obtained by calculating the traveling speed in each interval using the function identified by the calculated coefficients. In FIG. 28, the actual speed and the speed calculated by using the identified function. Thus, the fact that a highly precise traveling speed is obtained is verified by using the vertical acceleration. FIG. 29 shows a correspondence table generated by using the traveling speed.

4-5. How to Carry Mobile Terminal

Figure 30:
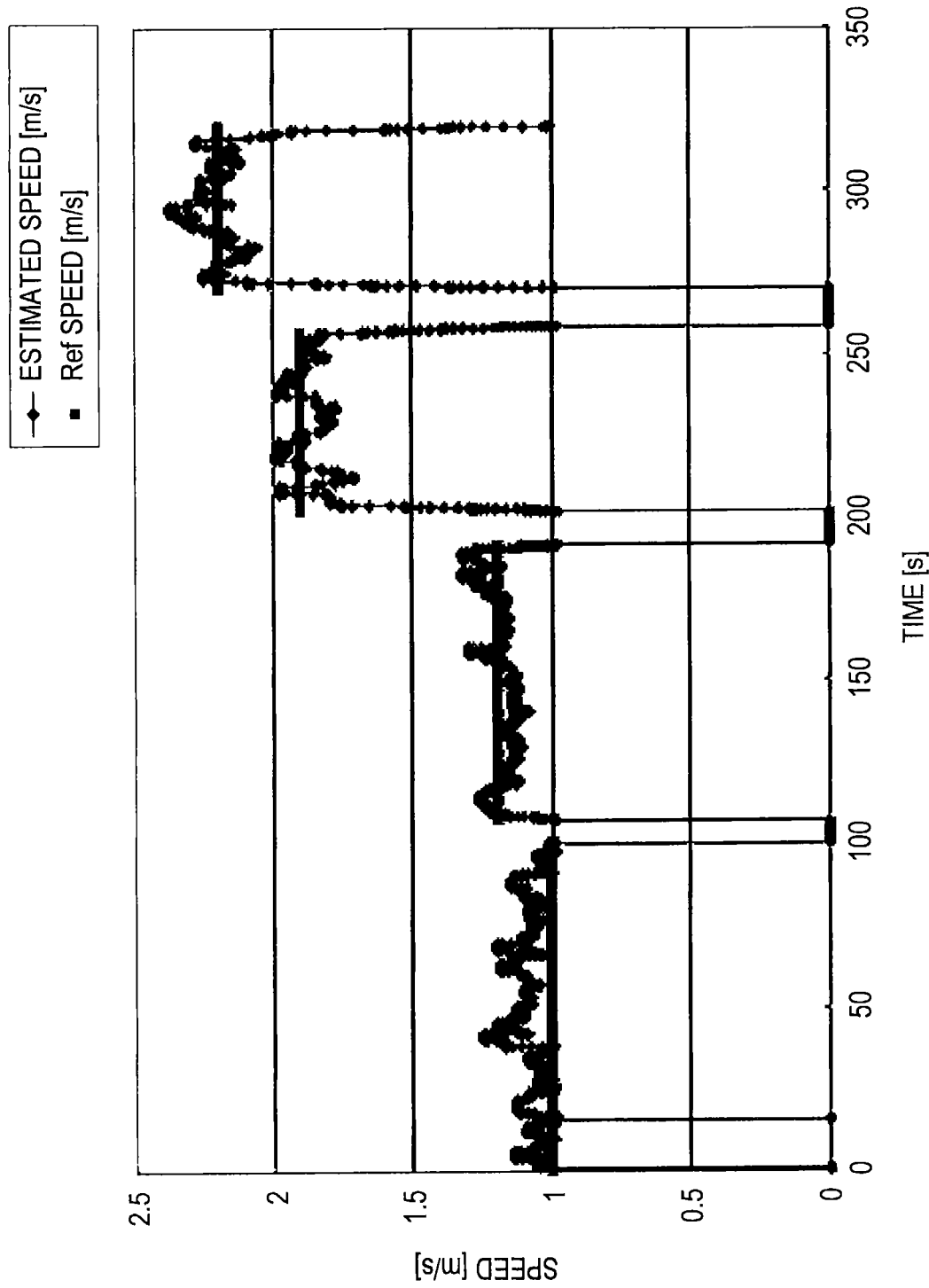
FIG. 30 is a graph showing experimental results comparing the estimated speed calculated by using the function identified based on the vertical acceleration measured by putting the mobile terminal according to the embodiment into a breast pocket and the actual speed in each interval.
Figure 31:
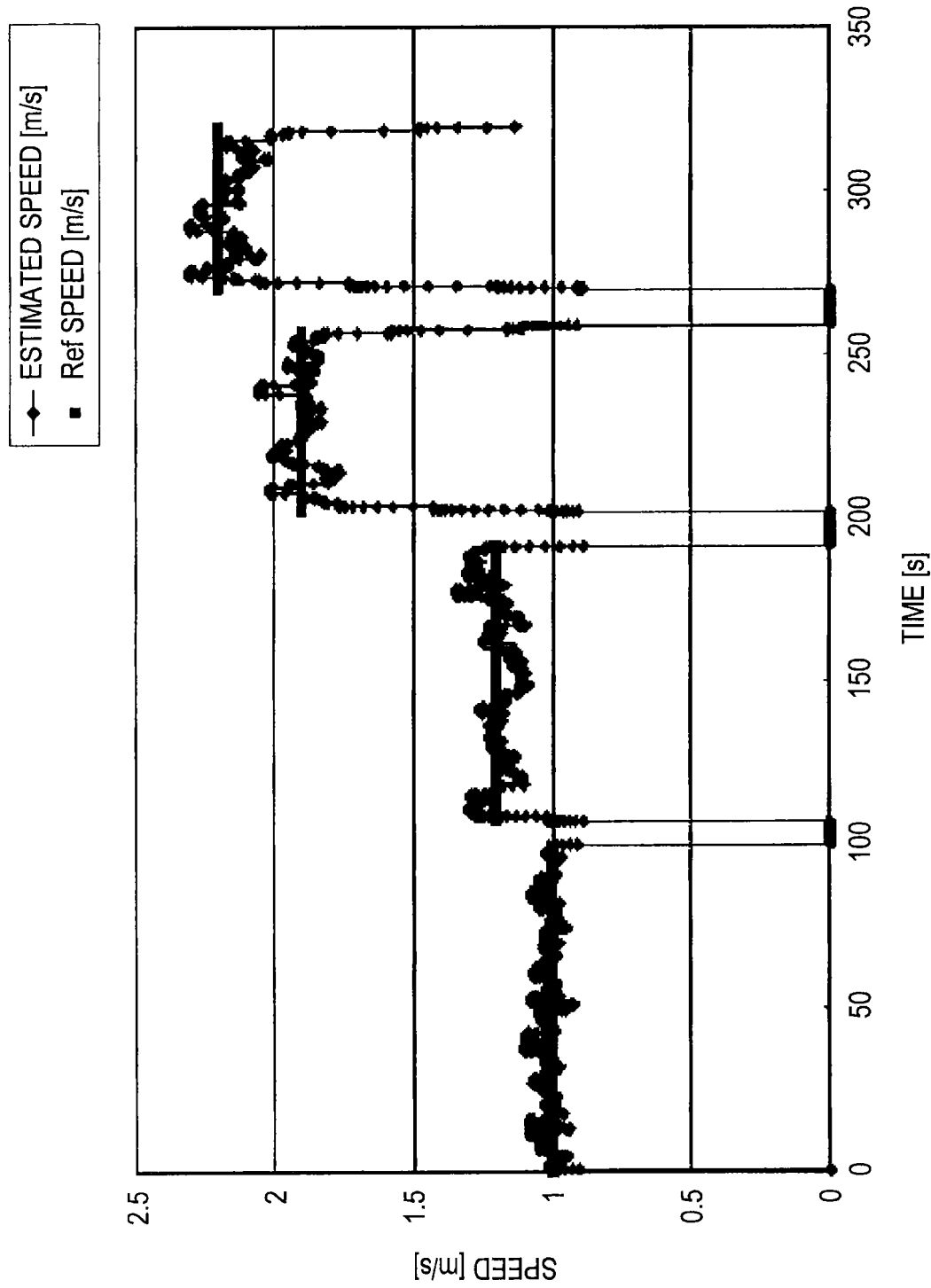
FIG. 31 is a graph showing experimental results comparing the estimated speed calculated by using the function identified based on the vertical acceleration measured by putting the mobile terminal according to the embodiment into an abdomen pocket and the actual speed in each interval.
Figure 32:
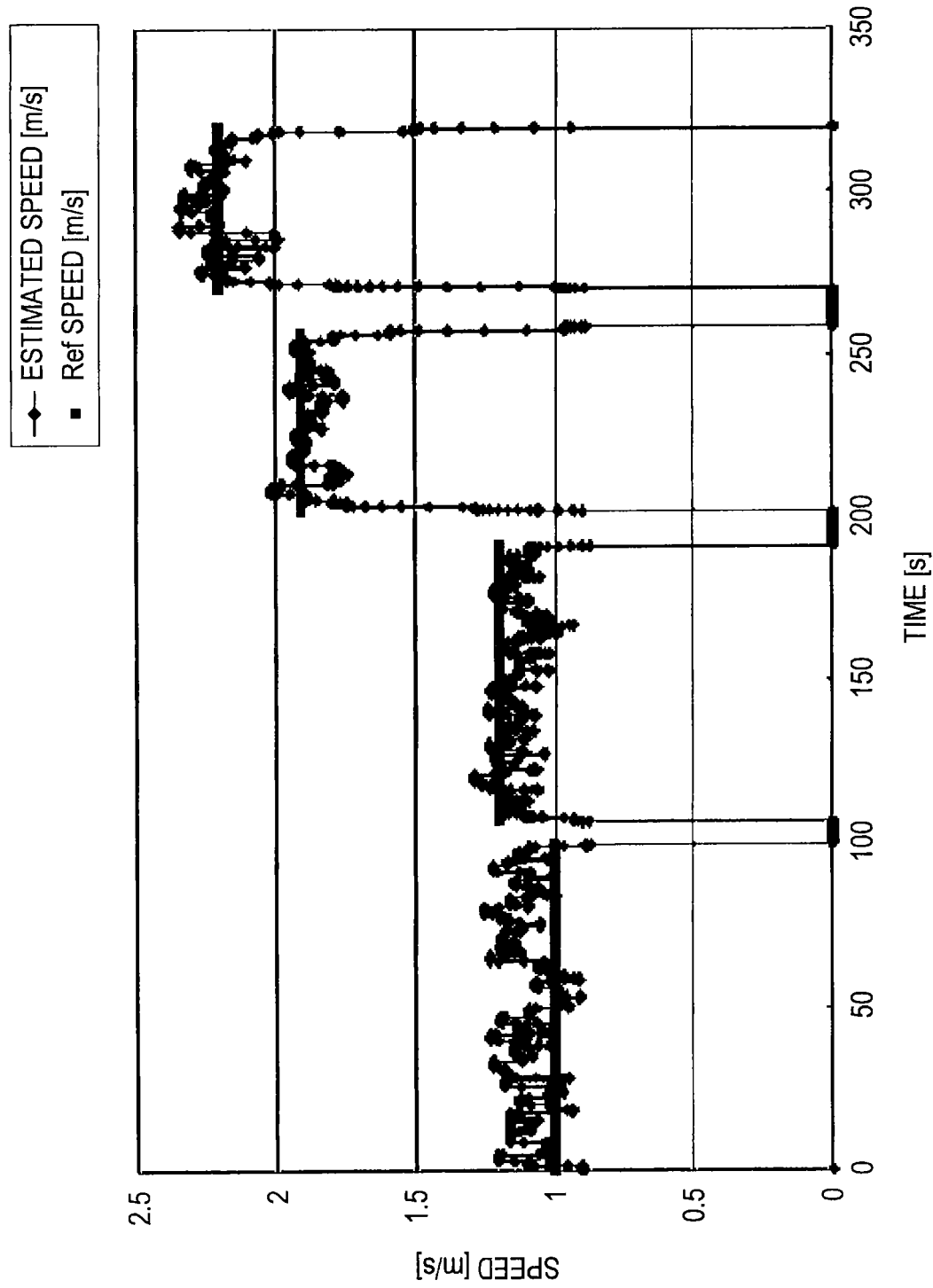
FIG. 32 is a graph showing experimental results comparing the estimated speed calculated by using the function identified based on the vertical acceleration measured by putting the mobile terminal according to the embodiment into a hip pocket and the actual speed in each interval.
Figure 33:
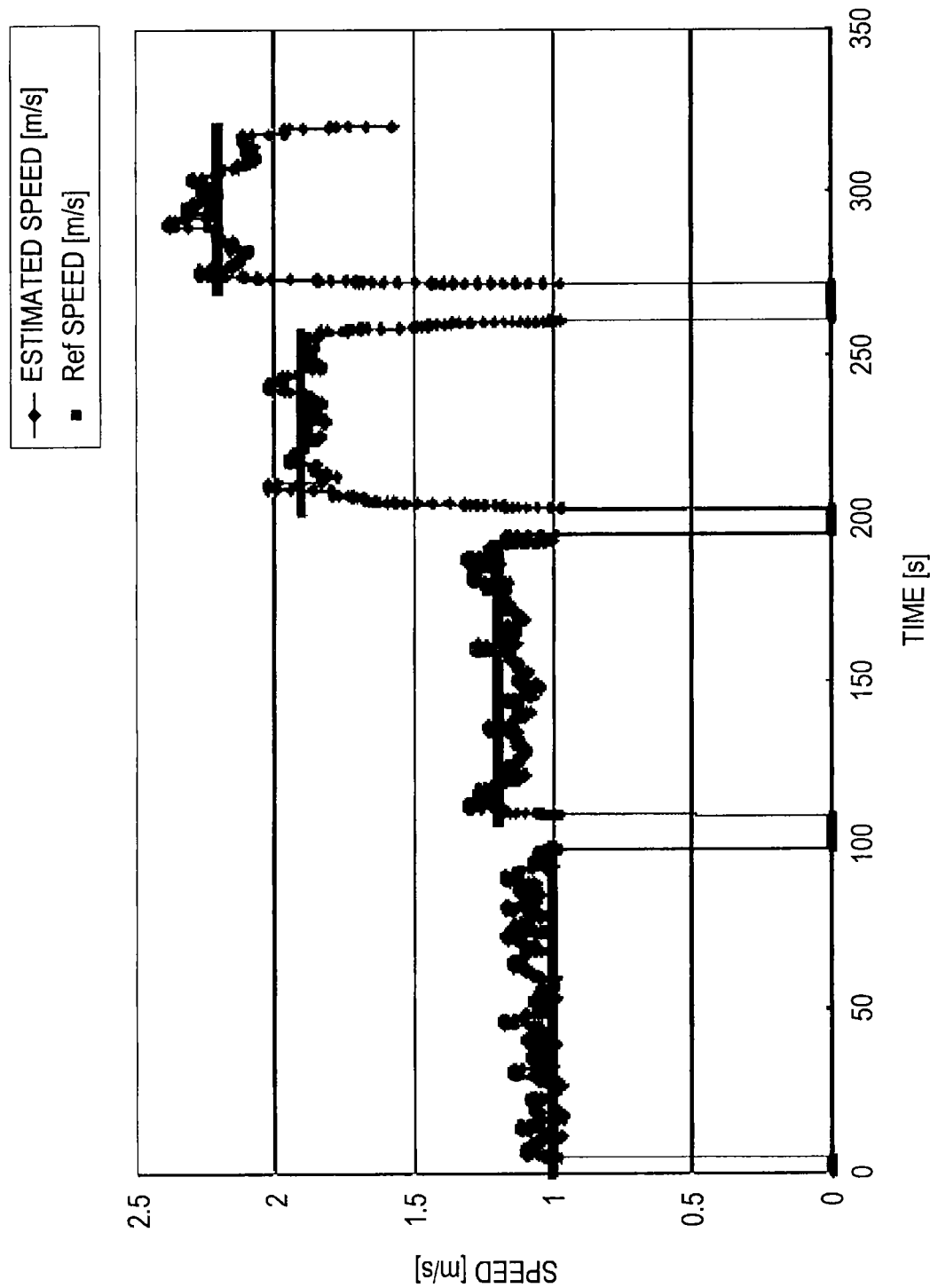
FIG. 33 is a graph showing experimental results comparing the estimated speed calculated by using the function identified based on the vertical acceleration measured by putting the mobile terminal according to the embodiment into an obliquely hung bag and the actual speed in each interval.

Next, the dependence on how to carry the mobile terminal 300 will be verified with reference to FIGS. 30 to 33. FIG. 30 is a graph showing experimental results comparing the estimated speed calculated by using the function identified based on the vertical acceleration measured by putting the mobile terminal according to the embodiment into a breast pocket and the actual speed in each interval. FIG. 31 is a graph showing experimental results comparing the estimated speed calculated by using the function identified based on the vertical acceleration measured by putting the mobile terminal according to the embodiment into an abdomen pocket and the actual speed in each interval. FIG. 32 is a graph showing experimental results comparing the estimated speed calculated by using the function identified based on the vertical acceleration measured by putting the mobile terminal according to the embodiment into a hip pocket and the actual speed in each interval. FIG. 33 is a graph showing experimental results comparing the estimated speed calculated by using the function identified based on the vertical acceleration measured by putting the mobile terminal according to the embodiment into an obliquely hung bag and the actual speed in each interval.

Examples of using the walking tempo and the vertical acceleration as input values have been described above and the input values need to have a strong correlation with the speed regardless of how the user carries the mobile terminal 300. Methods of carrying, for example, the mobile terminal 300 generally include carrying the mobile terminal in a breast pocket, carrying the mobile terminal in an abdomen pocket, carrying the mobile terminal in a hip pocket, and carrying the mobile terminal in a bag. In addition, for example, carrying the mobile terminal mounted on the head, mounted on the upper arm, as a wrist watch, as a neck strap, viewing the screen while holding in a hand, and in a trouser front packet can be considered.

FIGS. 30 to 33 verify the dependence of the vertical acceleration on how to carry the mobile terminal. For example, FIG. 30 shows the estimated speed calculated by using the vertical acceleration detected when the mobile terminal 300 is carried in a breast pocket as the input value and the actual speed. FIG. 31 shows the estimated speed calculated by using the vertical acceleration detected when the mobile terminal 300 is carried in an abdomen pocket as the input value and the actual speed. FIG. 32 shows the estimated speed calculated by using the vertical acceleration detected when the mobile terminal 300 is carried in a hip pocket as the input value and the actual speed. FIG. 33 shows the estimated speed calculated by using the vertical acceleration detected when the mobile terminal 300 is carried in an obliquely hung bag as the input value and the actual speed.

As shown in these graphs, the vertical acceleration has a linear correlation with the speed regardless of how the mobile terminal is carried. Therefore, it turns out that when the vertical acceleration is used as the input value, a highly precise speed can be obtained like when the walking tempo is used and therefore, a highly precise step can be calculated.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

In the above embodiments, for example, GPS is cited as an example of the positioning satellite, but naturally the positioning satellite is not limited to GPS. The positioning satellite may be any of various positioning satellites such as Galileo, GLONASS, Hokuto, and Michibiki. In this case, one type of satellites may be used as positioning satellites or positioning signals by a plurality of types of satellites may be combined and used. Therefore, the configuration to be used to acquire position information can be changed appropriately in accordance with the technical level when the embodiment is carried out.

In the present specification, steps described in a flow chart include not only a process performed chronologically in the described order, but also processes that are not necessarily be performed chronologically and performed in parallel or individually. Even steps that are executed chronologically may naturally be changed in order appropriately depending on the circumstances.

Additionally, the present technology may also be configured as below.

(1)
An information processing apparatus including:
an absolute position acquiring section that acquires an absolute position of a user;
an acquiring section that acquires a first value indicating a walking tempo of the user who is walking;
a calculation section that calculates a second value indicating a step or a traveling speed of the user by using, as a trigger, movement of a predetermined distance based on the absolute position; and
a learning section that learns a correspondence between the first value and the second value by using the second value calculated.

(2)
The information processing apparatus according to (1), further including:
a decision section that decides a value of the predetermined distance based on precision of the absolute position.

(3)
The information processing apparatus according to (2),
wherein the decision section estimates the precision of the absolute position based on map information and decides the value of the predetermined distance.

(4)
The information processing apparatus according to any one of (2) and (3),
wherein the absolute position acquiring section acquires the absolute position based on distances to a plurality of external devices connected by wireless communication, and
wherein the decision section estimates the precision of the absolute position based on a number of the external devices connected and decides the value of the predetermined distance.

(5)
The information processing apparatus according to any one of (1) to (4), further including:
a walking determination section that determines whether the user is walking,
wherein the acquiring section acquires the first value when it is determined that the user is walking.

(6)
The information processing apparatus according to any one of (1) to (5), further including:
an azimuth acquiring section that acquires an azimuth in which the user is heading; and
an autonomous positioning section that estimates the second value at a current time from the first value acquired by the acquiring section by using the correspondence learned by the learning section, and calculates a current position based on the second value and the azimuth.

(7)
The information processing apparatus according to (6),
wherein the autonomous positioning section calculates the current position when the absolute position acquiring section cannot acquire the absolute position.

(8)
The information processing apparatus according to any one of (6) and (7), further including:
a navigation section that guides a path using the current position calculated by the autonomous positioning section.

(9)
An information processing method including:
acquiring a first value indicating a walking tempo of a user who is walking;
calculating a second value indicating a step or a traveling speed of the user by using movement of a predetermined distance by the user as a trigger; and
learning a correspondence between the first value and the second value by using the second value calculated.

(10)
A program causing a computer to function as:
an information processing apparatus including
an absolute position acquiring section that acquires an absolute position of a user,
an acquiring section that acquires a first value indicating a walking tempo of the user who is walking,
a calculation section that calculates a second value indicating a step or a traveling speed of the user by using, as a trigger, movement of a predetermined distance based on the absolute position, and
a learning section that learns a correspondence between the first value and the second value by using the second value calculated.

(11)
A computer readable recording medium storing a program causing a computer to function as
an information processing apparatus including
an absolute position acquiring section that acquires an absolute position of a user,
an acquiring section that acquires a first value indicating a walking tempo of the user who is walking,
a calculation section that calculates a second value indicating a step or a traveling speed of the user by using, as a trigger, movement of a predetermined distance based on the absolute position, and
a learning section that learns a correspondence between the first value and the second value by using the second value calculated.

REFERENCE SIGNS LIST 100, 200, 300 mobile terminal
101 absolute positioning section
103 walking determination section
105 counting section
107 walking tempo calculation section
109 distance threshold decision section
111, 211 step calculation section
113 learning section
115 azimuth acquiring section
117 autonomous positioning section
119 navigation section
121 map information storage section
123 correspondence table storage section
210, 310 function identification section

The invention claimed is:

1. An information processing apparatus, comprising:
an absolute position acquiring section configured to:
  receive a signal from a position sensor; and
  acquire an absolute user position based on the signal;
an acquiring section configured to acquire a user walking tempo based on a number of user steps and a user travelling time;
a decision section configured to:
  set a threshold distance as a first distance value to be moved by a user, wherein
    the threshold distance is set as the first distance value based on a precision index of the position sensor that is one of equal to or greater than a threshold value at the absolute user position, and
    the threshold distance decreases with an increase in the precision index;
  set the threshold distance as a second distance value to be moved by the user, wherein
    the threshold distance is set as the second distance value based on the precision index of the position sensor that is smaller than the threshold value at the absolute user position, and
    the first distance value is less than the second distance value;
a calculation section configured to calculate a user speed based on a movement of the user by the threshold distance from the absolute user position;
a learning section configured to generate a correspondence between the user walking tempo and the user speed;
an autonomous position section configured to calculate a current user position based on the correspondence between the user walking tempo and the user speed, wherein
  the current user position is calculated by the autonomous position section based on inability of the absolute position acquiring section to acquire the absolute user position based on the signal received from the position sensor;
a navigation section configured to generate a path based on the current user position; and
a display section configured to display information associated with the current user position and the path to guide the user.

2. The information processing apparatus according to claim 1, wherein the decision section is further configured to:
determine a precision of the absolute user position based on map information; and
determine the threshold distance based on the precision of the absolute user position.

3. The information processing apparatus according to claim 1, wherein
the absolute position acquiring section is further configured to acquire the absolute user position based on a distance between each external device of a plurality of external devices and the absolute position acquiring section,
each external device of the plurality of external devices is connected by wireless communication to the absolute position acquiring section, and
the decision section is further configured to determine the precision index of the position sensor at the absolute user position based on a number of the plurality of external devices connected by the wireless communication to the absolute position acquiring section.

4. The information processing apparatus according to claim 1, further comprising a walking determination section configured to determine a user motion,
wherein the acquiring section is further configured to acquire the user walking tempo based on the user motion.

5. The information processing apparatus according to claim 1, further comprising an azimuth acquiring section configured to acquire a user azimuth, wherein
the autonomous positioning section is further configured to:
determine the user speed at a current time based on the user walking tempo, wherein the user walking tempo is based on the correspondence; and
calculate the current user position based on the user speed and the user azimuth.

6. An information processing method, comprising:
in an information processing device:
receiving a signal from a position sensor;
acquiring an absolute user position based on the signal;
acquiring a user walking tempo based on a number of user steps and a user travelling time;
setting a threshold distance as a first distance value to be moved by a user, wherein
  the threshold distance is set as the first distance value based on a precision index of the position sensor that is one of equal to or greater than a threshold value at the absolute user position, and
  the threshold distance decreases with an increase in the precision index;
setting the threshold distance as a second distance value to be moved by the user, wherein
  the threshold distance is set as the second distance value based on the precision index of the position sensor that is smaller than the threshold value at the absolute user position, and the first distance value is less than the second distance value;

calculating a user speed based on a movement of the user by the threshold distance from the absolute user position;

generating a correspondence between the user walking tempo and the user speed;

calculating a current user position based on the correspondence between the user walking tempo and the user speed, wherein the current user position is calculated based on inability of acquiring the absolute user position based on the signal received from the position sensor;

generating a path based on the current user position; and displaying information associated with the current user position and the path to guide the user.

7. A non-transitory computer-readable medium having stored thereon computer-executable instructions which, when executed by an image processing apparatus, cause the image processing apparatus to execute operations, the operations comprising:

receiving a signal from a position sensor;

acquiring an absolute user position based on the signal;

acquiring a user walking tempo based on a number of user steps and a user travelling time;

setting a threshold distance as a first distance value to be moved by a user, wherein the threshold distance is set as the first distance value based on a precision index of the position sensor that is one of equal to or greater than a threshold value at the absolute user position, and the threshold distance decreases with an increase in the precision index;

setting the threshold distance as a second distance value to be moved by the user, wherein the threshold distance is set as the second distance value based on the precision index of the position sensor that is smaller than the threshold value at the absolute user position, and the first distance value is less than the second distance value;

calculating a user speed based on a movement of the user by the threshold distance from the absolute user position;

generating a correspondence between the user walking tempo and the user speed;

calculating a current user position based on the correspondence between the user walking tempo and the user speed, wherein the current user position is calculated based on inability of acquiring the absolute user position based on the signal received from the position sensor;

generating a path based on the current user position; and displaying information associated with the current user position and the path to guide the user.

* * * * *